United States Patent
Noguchi et al.

(10) Patent No.: US 11,537,385 B2
(45) Date of Patent: Dec. 27, 2022

(54) NOTIFICATION DEVICE

(71) Applicant: HONDA MOTOR CO., LTD., Tokyo (JP)

(72) Inventors: Junpei Noguchi, Saitama (JP); Gaku Shimamoto, Saitama (JP); Yuta Takada, Tokyo (JP); Ryoma Taguchi, Tokyo (JP); Shogo Kobayashi, Saitama (JP); Hidekazu Ohnishi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/206,971

(22) Filed: Mar. 19, 2021

(65) Prior Publication Data

US 2021/0294592 A1 Sep. 23, 2021

(30) Foreign Application Priority Data

Mar. 19, 2020 (JP) .............................. JP2020-050304

(51) Int. Cl.
*G06F 8/65* (2018.01)
*G06F 9/48* (2006.01)

(52) U.S. Cl.
CPC .............. *G06F 8/65* (2013.01); *G06F 9/4881* (2013.01)

(58) Field of Classification Search
CPC .................................. G06F 8/65; G06F 9/4881
See application file for complete search history.

(56) References Cited

U.S. PATENT DOCUMENTS

| 2014/0310702 | A1* | 10/2014 | Ricci | G08G 1/096844 |
| | | | | 717/173 |
| 2016/0373913 | A1* | 12/2016 | Schwarz | G06F 8/65 |
| 2018/0150290 | A1* | 5/2018 | Matsuda | G06F 11/1433 |
| 2019/0088128 | A1* | 3/2019 | Adireddy | G06Q 30/0284 |
| 2019/0179308 | A1 | 6/2019 | Hattori | |
| 2019/0187976 | A1* | 6/2019 | Lee | G06F 8/658 |
| 2020/0092396 | A1* | 3/2020 | Wu | H04W 72/1289 |
| 2020/0116505 | A1* | 4/2020 | Lei | G01C 21/3682 |
| 2020/0204702 | A1* | 6/2020 | Park | H04N 1/32144 |

FOREIGN PATENT DOCUMENTS

JP 2017-218019 A 12/2017

* cited by examiner

*Primary Examiner* — Phillip H Nguyen
(74) *Attorney, Agent, or Firm* — Paratus Law Group, PLLC

(57) ABSTRACT

A notification device, configured to notify an accommodation area that can accommodate a moving body, in which the performance of the moving body that can be accommodated in the accommodation area is predetermined; includes: a first determination unit configured to determine a first accommodation area that can accommodate the moving body with the current performance, based on the current performance of the moving body; a second determination unit configured to determine a second accommodation area that can accommodate the moving body with the performance after rewriting, based on the performance after the rewriting the software of the moving body; and a notification unit configured to separately notify the first accommodation area and the second accommodation area.

6 Claims, 11 Drawing Sheets

| PARKING SPACE ID | TYPE OF PARKING SPACE | | PARKING INFORMATION | |
|---|---|---|---|---|
| | ENERGY SOURCE SUPPLY POSSIBILITY | COMMUNICATION ENVIRONMENT (RADIO WAVE INTENSITY) | PARKING STATUS | VEHICLE ID |
| 001 | POSSIBLE | STRONG | FULL | KH001 |
| 002 | NOT POSSIBLE | STRONG | EMPTY | — |
| 003 | NOT POSSIBLE | WEAK | FULL | KH002 |
| ⋮ | ⋮ | ⋮ | ⋮ | ⋮ |

NOTIFICATION DEVICE

CROSS-REFERENCE TO RELATED APPLICATIONS

The present application claims the benefit of priority of Japanese Patent Application No. 2020-050304, filed on Mar. 19, 2020, the content of which is incorporated herein by reference.

TECHNICAL FIELD

The present invention relates to a notification device that notifies an accommodation area that can accommodate a moving body.

BACKGROUND ART

Vehicles in recent years have been digitized and in-vehicle devices are controlled by a control device called an electronic control unit (ECU). Such a control device controls an in-vehicle device by executing a control program stored in advance in the own device. Further, a technique capable of updating the control program of such a control device is also known.

For example, JP-A-2017-218019 discloses the technology in which when the automatic driving system can be updated, the user is notified of the amount of money required for updating the automatic driving system and the difference in the hourly unit price of the charged automatic driving before and after the update of the system.

In the related art, it may not be possible to urge the user to rewrite the software of the mobile body and there is room for improvement in such view.

SUMMARY

The present invention provides a notification device that can prompt the user to rewrite the software of the moving body.

According to an aspect of the invention, there is provided a notification device, configured to notify an accommodation area that can accommodate a moving body, where: the performance of the moving body that can be accommodated in the accommodation area is predetermined; and the notification device includes: a first determination unit configured to determine a first accommodation area that can accommodate the moving body with the current performance, based on the current performance of the moving body; a second determination unit configured to determine a second accommodation area that can accommodate the moving body with the performance after rewriting, based on the performance after the rewriting the software of the moving body; and a notification unit configured to separately notify the first accommodation area and the second accommodation area.

According to the present invention, the user can be urged to rewrite the software of the moving body.

DESCRIPTION OF EMBODIMENTS

Hereinafter, an embodiment of a software rewriting device of the present invention will be described with reference to the accompanying drawings. In the following description of the embodiment, an example will be described in which the moving body in the present invention is a vehicle such as the automobile and the accommodation area in the present invention is a parking lot.

First, a vehicle provided with a software rewriting device of the present embodiment will be described. The vehicle provided with a software rewriting device of the present embodiment (hereinafter, also referred to as vehicle M) is a vehicle that includes a drive source (for example, a traveling driving force output device 200 described later) and wheels (for example, two wheels, three wheels, or four wheels) including drive wheels driven by the power of the drive source. As the drive source of the vehicle M, for example, an electric motor, an internal combustion engine (for example, a gasoline engine), or a combination of the electric motor and the internal combustion engine is used.

Figure 1:
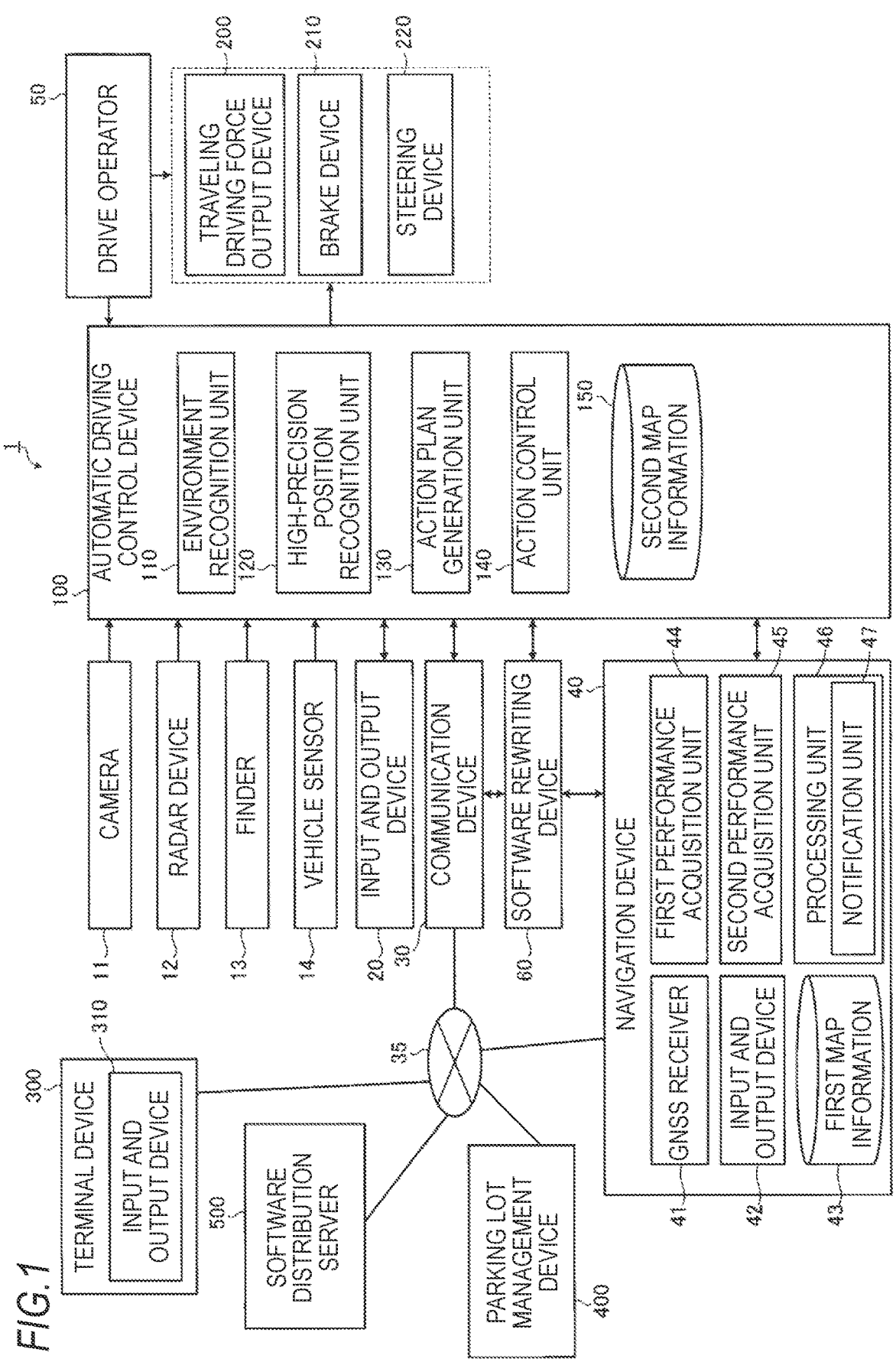
FIG. 1 is a diagram showing an example of a configuration of a vehicle system according to the present embodiment.

Further, the vehicle M includes a vehicle system. 1 shown in FIG. 1. The vehicle system 1 has a function capable of performing all driving tasks related to the vehicle M, at least within a limited specific area (for example, in a parking lot PA described later). Here, the driving task is, for example, real-time driving function necessary for maneuvering the vehicle M, such as controlling the left-right movement (steering) of the vehicle M, controlling the movement in the front-rear direction (acceleration, deceleration), and monitoring the driving environment, and a tactical function such as planning of a traveling track.

As shown in FIG. 1, the vehicle system 1 includes a camera 11, a radar device 12, a finder 13, a vehicle sensor 14, an input and output device 20, a communication device 30, a navigation device 40, and a driving operator 50, a software rewriting device 60, an automatic driving control device 100, a traveling driving force output device 200, a brake device 210, and a steering device 220. Each of the devices is communicably connected to each other via a wired or wireless communication network. The communication network connecting each of the devices is, for example, a controller area network (CAN).

The camera 11 is a digital camera that photographs the periphery of the vehicle M (for example, in front of the vehicle M) and outputs the image data obtained by photographing to the automatic driving control device 100. The radar device 12 is, for example, a radar device that uses radio waves in the millimeter wave band, detects the position of an object in the vicinity of the vehicle M (for example, the front, the rear, and the side of the vehicle M), and outputs the detection result to the automatic driving control device 100.

The finder 13 is, for example, laser imaging detection and ranging (LIDAR) and uses a predetermined laser beam to measure the distance to an object (target object) in the vicinity of the vehicle M (for example, the front, the rear, and the side of the vehicle M), and outputs the measurement result to the automatic driving control device 100.

Examples of the vehicle sensor 14 includes a vehicle speed sensor that detects the speed of the vehicle M, an acceleration sensor that detects the acceleration of the vehicle M, an angular velocity sensor that detects the angular velocity around the vertical axis of the vehicle M, and an orientation sensor that detects the direction of the vehicle M. Further, the vehicle sensor 14 includes a radio wave intensity sensor that detects the intensity of the radio wave (that is, the communication environment) used by the communication device 30 for communication. The vehicle sensor 14 outputs the detection result of each sensor to the automatic driving control device 100. The automatic driving control device 100 may output the detection result of each sensor of the vehicle sensor 14 to the software rewriting device 60 or the like.

The input and output device 20 includes an output device that outputs various information to a user of the vehicle M (hereinafter, also simply referred to as a user) and an input device that receives various input operations from the user. In the present embodiment, the user is not limited to the person who manages or owns the vehicle M and uses the vehicle M. For example, the user may be a person who uses the vehicle M on behalf of the person who manages or owns the vehicle M at the request of the person who manages or owns the vehicle M.

The output device of the input and output device 20 is, for example, a display that displays based on the processing result of the automatic driving control device 100. The output device may be a speaker, a buzzer, an indicator light, or the like. Further, the input device of the input and output device 20 is, for example, a touch panel or an operation button (key, switch, etc.) that outputs an operation signal corresponding to an input operation received from the user to the automatic driving control device 100.

The communication device 30 is wirelessly connected to a network 35 and communicates with another device provided outside the vehicle system 1 via the network 35. The network 35 is, for example, a mobile communication network, a Wi-Fi network, Bluetooth (registered trademark), dedicated short range communication (DSRC), or the like.

The communication device 30 communicates with, for example, a terminal device 300 carried by the user, a parking lot management device 400 that manages a parking lot PA where the vehicle M can be parked, a software distribution server 500 that distributes software of the vehicle M, and the like. The terminal device 300 is, for example, a smartphone or a tablet terminal, and is an electronic device connected to the network 35 and including an input and output device 310. The input and output device 310 is, for example, a display that displays various information to the user, a touch panel that receives the user's input operation, and the like. Further, the software distribution server 500 is, for example, a server device managed by a manufacturer (for example, a manufacturer) of the vehicle M. The parking lot PA and the parking lot management device 400 will be described later.

The navigation device 40 includes a global navigation satellite system (GNSS) receiver 41 and an input and output device 42. Further, the navigation device 40 includes a storage device (not shown) such as a hard disk drive (hereinafter, also referred to as HDD) and a flash memory, and first map information 43 is stored in the storage device. The first map information 43 is, for example, information representing a road shape by a link indicating a road and a node connected by the link. Further, the first map information 43 may include information representing the curvature of the road and a point of interest (POI).

The GNSS receiver 41 specifies the latitude and longitude of the point where the vehicle M is located as the position of the vehicle M based on the signal received from a GNSS satellite. Further, the navigation device 40 may specify or correct the position of the vehicle M by an inertial navigation system (INS) using the output of the vehicle sensor 14.

The input and output device 42 includes an output device that outputs various information to the user and an input device that receives various input operations from the user. The output device of the input and output device 42 is, for example, a display that displays based on the processing result of the navigation device 40 (for example, displays a route on the map described later). Further, the input device of the input and output device 42 is, for example, a touch panel or an operation button (a key, a switch, or the like) that outputs an operation signal corresponding to the input operation received from the user to the navigation device 40. The input and output device 42 may be shared with the input and output device 20.

Although a detailed description will be omitted, the navigation device 40 determines, for example, a route from the position of the vehicle M specified by the GNSS receiver 41 to the destination input by the user (hereinafter, also referred to as a route on the map) with reference to the first map information 43. Then, the navigation device 40 guides the determined route on the map to the user by the input and output device 42. Further, the navigation device 40 is configured to be able to output information indicating the specified position of the vehicle M and the determined route on the map to the software rewriting device 60, the automatic driving control device 100, and the like. A first performance acquisition unit 44, a second performance acquisition unit 45, a processing unit 46 including a notification unit 47, and the like shown in FIG. 1 will be described later.

A part or all of the functions of the navigation device 40 may be realized by the terminal device 300. A part or all the functions of the navigation device 40 may be realized by an external server device (navigation server) capable of communicating with the vehicle system 1 by the communication device 30 or the like.

The driving operator 50 is various operators such as an accelerator pedal, a brake pedal, a shift lever, a steering wheel, a deformed steering wheel, a joystick, and the like. The driving operator 50 is provided with a sensor that detects the amount of operation or the presence of operation on the driving operator 50. The detection result by the sensor of the driving operator 50 is output to a part or all of the automatic driving control device 100, the traveling driving force output device 200, the brake device 210, and the steering device 220.

The traveling driving force output device 200 outputs the traveling driving force (torque) for the vehicle M to travel to drive wheels. The traveling driving force output device 200 includes, for example, an electric motor and an electric motor electronic control unit (ECU) that controls the electric motor. The electric motor ECU controls the electric motor based on the detection result by the sensor of the driving operator 50 (for example, the accelerator pedal) and the control information from the automatic driving control device 100. Further, when the vehicle M includes an internal combustion engine and a transmission as a drive source, the traveling driving force output device 200 may include the internal combustion engine, and the transmission, and an ECU for controlling the internal combustion engine and the transmission.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor of the brake device 210 based on the detection result by the sensor of the driving operator 50 (for example, the brake pedal) and the control information from the automatic driving control device 100, and outputs the brake torque according to the braking operation to each wheel.

The steering device 220 includes, for example, a steering ECU and an electric motor. The electric motor of the steering device 220, for example, applies a force to the rack and pinion mechanism to change the direction of the steering wheel. The steering ECU drives the electric motor of the steering device 220 based on the detection result by the sensor of the driving operator 50 (for example, the steering wheel) and the control information from the automatic driving control device 100, and changes the direction of the steering wheel (that is, the steering angle).

The automatic driving control device 100 includes an environment recognition unit 110, a high-precision position recognition unit 120, an action plan generation unit 130, and an action control unit 140. Further, the automatic driving control device 100 includes a storage device (not shown) realized by a flash memory or the like accessible to each functional unit (for example, the high-precision position recognition unit 120) of the automatic driving control device 100, and second map information 150 is stored in the storage device.

The second map information 150 is more accurate map information than the first map information 43. The second map information 150 includes, for example, information indicating the center of a lane, information indicating a lane boundary line (for example, a road lane marking), and the like. Further, the second map information 150 may include road information, traffic regulation information, address information, facility information, telephone number information, and the like.

Further, the second map information 150 may be updated at any time by the communication device 30 communicating with another device. For example, when the vehicle M enters the parking lot PA, the communication device 30 receives information indicating the lanes in the parking lot PA and the position of each parking space (hereinafter, also referred to as map information in the parking lot) from the parking lot management device 400. Then, the automatic driving control device 100 updates the second map information 150 to incorporate the received map information in the parking lot into the second map information 150. As a result, the automatic driving control device 100 can specify the position of each parking space in the parking lot PA with reference to the second map information 150.

The environment recognition unit 110 performs sensor fusion processing on the information acquired by a part or all of the camera 11, the radar device 12, and the finder 13, recognizes an object in the vicinity of the vehicle M and recognizes the position of the object. The environment recognition unit 110 recognizes, for example, obstacles, road shapes, traffic lights, guardrails, utility poles, surrounding vehicles (including traveling states such as speed and acceleration, and parking states), lane marks, pedestrians, and recognizes the positions thereof.

The high-precision position recognition unit 120 recognizes the detailed position and posture of the vehicle M with reference to the position of the vehicle M specified by the navigation device 40, the detection result by the vehicle sensor 14, the image taken by the camera 11, the second map information, and the like. The high-precision position recognition unit 120 recognizes, for example, the traveling lane on which the vehicle M is traveling, or recognizes the relative position and posture of the own vehicle with respect to the traveling lane. The high-precision position recognition unit 120 also recognizes, for example, the position of the vehicle M in the parking lot PA.

The action plan generation unit 130 generates an action plan for the vehicle M. Specifically, the action plan generation unit 130 generates a target track on which the vehicle M will travel in the future as an action plan of the vehicle M. The target track is information represented by disposing points (track points) to be reached by the vehicle M for each predetermined traveling distance (for example, about several meters). Further, the target track may include information on speed elements such as the target speed and the target acceleration of the vehicle M at each predetermined time or at each track point. The action plan generation unit 130 generates an action plan according to, for example, an instruction of the parking lot management device 400 received by the communication device 30.

The action control unit 140 controls the vehicle M to act according to the action plan generated by the action plan generation unit 130. Specifically, the action control unit 140 controls the traveling driving force output device 200, the brake device 210, and the steering device 220 so that the vehicle M passes the target track generated by the action plan generation unit 130 at the scheduled time. The action control unit 140 controls, for example, the traveling driving force output device 200 and the brake device 210 based on the speed element associated with the target track, and controls the steering device 220 according to the degree of bending of the target track.

Each functional unit included in the automatic driving control device 100 is realized, for example, by a central processing unit (CPU) executing a predetermined program (software). Some or all of the functional units of the automatic driving control device 100 may be realized by hardware such as large scale integration (LSI), application specific integrated circuit (ASIC), field-programmable gate array (FPGA), graphics processing unit (GPU), and the like. For example, the storage device for storing the second map information 150 and the high-precision position recognition unit 120 may be realized by a map positioning unit (MPU). Further, a part or all of the functional units included in the automatic driving control device 100 may be realized by the cooperation of software and hardware.

The software rewriting device 60 is configured to be able to communicate with other devices outside the vehicle system 1 via the communication device 30 and is also configured to be able to communicate with other devices in the vehicle system 1 such as the navigation device 40 and the automatic driving control device 100. Then, the software rewriting device 60 communicates with the other devices to perform the rewriting process of rewriting the software of the vehicle M.

Here, the software of the vehicle M is, for example, a program for operating an in-vehicle device such as the navigation device 40 and the automatic driving control device 100, so-called firmware. Further, the software of the vehicle M may be data, for example, the first map information 43, the second map information 150, or the difference data for updating the data. Further, the software of the vehicle M may be the firmware of the software rewriting device 60 itself.

The software rewriting device 60 downloads (that is, receives) the software of the vehicle M from the software distribution server 500, for example, and performs a rewriting process of rewriting the software with the downloaded software. For example, when new firmware for the automatic driving control device 100 is downloaded from the software distribution server 500, the software rewriting device 60 performs the rewriting process of rewriting the firmware of the automatic driving control device 100 with the downloaded new firmware. When the software rewriting device 60 performs such a rewriting process, it is possible to stabilize the operation of the device whose software has been rewritten, improve the performance, add functions, and the like. An example of the configuration of the software rewriting device 60 will be described later with reference to FIG. 3 and the like.

Figure 2:
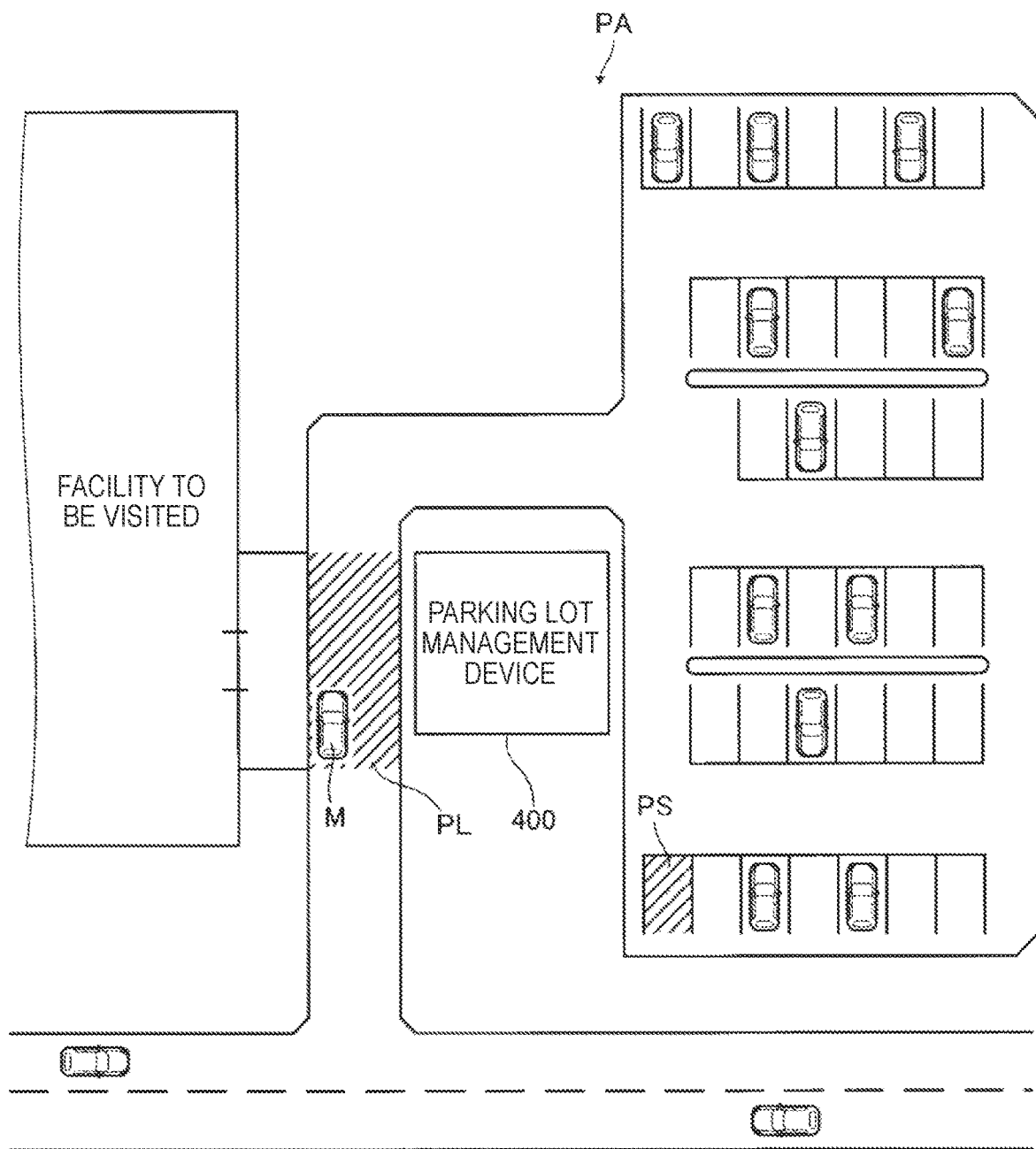
FIG. 2 is a diagram showing an example of a parking lot managed by a parking lot management device.

Next, an example of the parking lot PA where the vehicle M can be parked will be described with reference to FIG. 2. As shown in FIG. 2, the parking lot PA is an automatic valet parking type parking lot attached to the visiting facility to be visited by the user and is managed by the parking lot management device 400. The parking lot PA includes a plurality of parking spaces PS where a vehicle (for example, the vehicle M) can be parked, and a platform area PL provided in front of the plurality of parking spaces PS. Hereinafter, an example in which the user uses the parking lot PA, that is, the vehicle M enters the parking lot PA will be described.

Prior to using the parking lot PA, the user makes a reservation for using the parking lot PA (hereinafter, also referred to as a parking reservation) using the navigation device 40, the terminal device 300, or the like. The "user" is not limited to the owner and manager of the vehicle M, but includes, for example, a person (for example, a concierge) who performs procedures such as parking reservation on behalf of the owner of the vehicle M. In the parking reservation, the user inputs a vehicle ID that is an identifier (identification information) of the vehicle M, a scheduled parking time for parking the vehicle M in the parking lot PA, and the like. As the scheduled parking time, for example, the scheduled entry date and time when the vehicle M is scheduled to enter the parking lot PA and the scheduled exit date and time when the vehicle M is scheduled to leave the parking lot PA are input. The information input by the user is sent to the parking lot management device 400. The parking lot management device 400 refers to the received information and a management table (not shown) showing the parking reservation status of the parking lot PA and determines whether there is a parking space PS where the vehicle M can be parked at the scheduled parking time (the period from the scheduled entry date and time to the scheduled exit date and time). Then, if there is a parking space PS where the vehicle M can be parked, the parking lot management device 400 accepts the parking reservation and notifies the user that the vehicle M can be parked.

Next, when the scheduled parking time comes, the user rides the vehicle M on the platform area PL and gets off from the vehicle M at the platform area PL. After the user gets off the vehicle M, the vehicle M automatically drives and executes a self-propelled entry event to move to a predetermined parking space PS in the parking lot PA. For example, when the user gets off the vehicle M at the platform area PL, the user sends a request for starting a self-propelled entry event to the parking lot management device 400 with the terminal device 300 or the like. When the parking lot management device 400 receives the start request of the self-propelled entry event, the parking lot management device 400 determines the parking space PS where the vehicle M is to enter with reference to the parking space information table 442 described later and instructs the vehicle M to move to the parking space PS. Further, the parking lot management device 400 may also determine a route on which the vehicle M should travel to the parking space PS where the vehicle M should enter, and instruct the vehicle M to move along the route. Then, the vehicle M moves to the parking space PS instructed by the parking lot management device 400 while performing sensing by the camera 11, the radar device 12, the finder 13, or the like according to the instruction received from the parking lot management device 400.

When leaving the parking lot PA, the user causes the vehicle M to execute a self-propelled exit event. When the self-propelled exit event is executed, the vehicle M automatically drives from the parked parking space PS and moves to the platform area PL. For example, when the vehicle M is made to execute the self-propelled exit event, the user sends a request to start the self-propelled exit event to the parking lot management device 400 with their own terminal device 300 or the like. Upon receiving the request to start the self-propelled exit event, the parking lot management device 400 instructs the vehicle M to move to the platform area PL. Here, the parking lot management device 400 may also determine a route on which the vehicle M should travel to the platform area PL and instruct the vehicle M to move along the route. The vehicle M that has received the instruction from the parking lot management device 400 moves to the platform area PL while performing sensing by the camera 11, the radar device 12, the tinder 13, and the like. Then, the user gets on the vehicle M at the platform area PL and exits from the parking lot PA.

Figure 3:
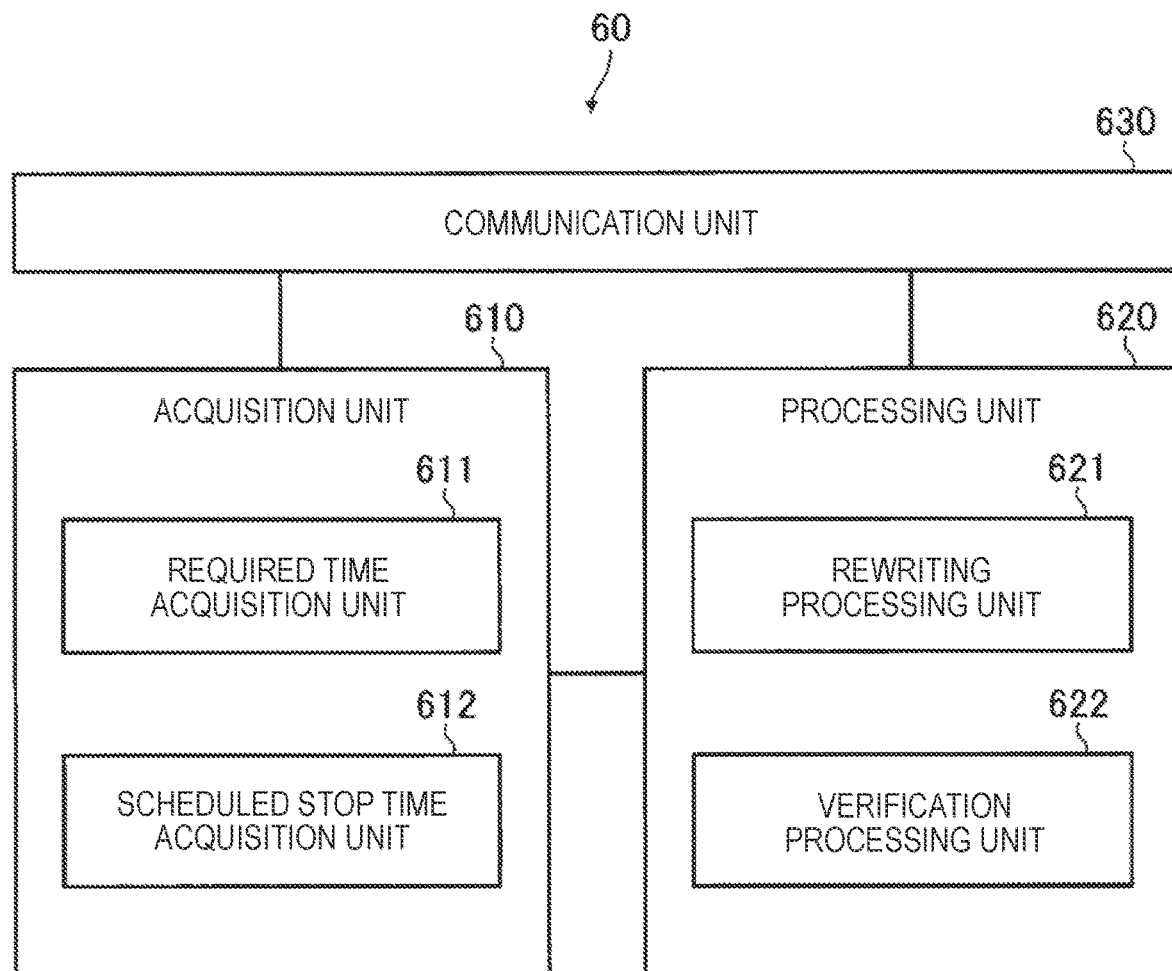
FIG. 3 is a diagram showing an example of a functional configuration of a software rewriting device.

Next, an example of the functional configuration of the software rewriting device 60 will be described with reference to FIG. 3. As shown in FIG. 3, the software rewriting device 60 includes an acquisition unit 610 that acquires various information, and a processing unit 620 that performs various processing based on the information acquired by the acquisition unit 610. Further, the software rewriting device 60 includes a communication unit 630 that functions as an interface for the software rewriting device 60 to communicate with another device. The acquisition unit 610 and the processing unit 620 are configured to be able to communicate with other devices as appropriate via the communication unit 630.

Each functional unit included in the software rewriting device 60 is realized, for example, by the central processing unit (CPU) executing a predetermined program (software) stored in advance. Some or all of the functional units of the software rewriting device 60 may be realized by hardware such as large scale integration (LSI), application specific integrated circuit (ASIC), field-programmable gate array (FPGA), and graphics processing unit (GPU), and may be realized by the cooperation of software and hardware.

When rewriting the software of the vehicle M, the user may not be able to use a part (for example, a device for which the software is rewritten) or all of the vehicle system 1, which may deteriorate user convenience. Therefore, the software rewriting device 60 rewrites the software of the vehicle M during the period in which the user is not expected to use the vehicle M in order to rewrite the software of the moving body while avoiding the deterioration of user convenience.

Specifically, the acquisition unit 610 includes a required time acquisition unit 611 and a scheduled stop time acquisition unit 612. The required time acquisition unit 611 acquires information indicating the required time for rewriting the software of the vehicle M. The information indicating the required time may be distributed by the software distribution server 500 or may be acquired by the required time acquisition unit 611 performing a predetermined calculation. When acquiring by calculation, the required time can be obtained from, for example, the data size of the software of the vehicle M and the data size rewritable by the software rewriting device 60 or the like per unit time. Further, the required time acquisition unit 611 may acquire a fixed time as the required time regardless of the data size of the software of the vehicle M.

The scheduled stop time acquisition unit 612 acquires information indicating the scheduled stop time at a predetermined position of the vehicle M. Here, the predetermined position is a position where the vehicle M is systematically stopped. More specifically, the predetermined position is a position where the date and time when the vehicle M starts to stop (hereinafter, also referred to as the scheduled stop start date and time) and the date and time when the vehicle M ends the stop (hereinafter, also referred to as the scheduled stop end date and time) are determined in advance.

The scheduled stop time acquisition unit 612 derives, for example, the period (time difference) from the scheduled stop start date and time to the scheduled stop end date and time at the predetermined position as the scheduled stop time at the predetermined position, and acquires information indicating the derived scheduled stop time. As a result, it is possible to acquire information indicating a scheduled stop time indicating a period in which the vehicle M is likely to be stopped according to a predetermined plan.

In the present embodiment, an example will be described below in which the predetermined position is the parking lot PA and the scheduled stop time at the predetermined position is the scheduled parking time in the parking lot PA. That is, the scheduled stop time acquisition unit 612 acquires information indicating the scheduled parking time of the vehicle M in the parking lot PA. For example, the scheduled stop time acquisition unit 612 derives the period from the scheduled entry date and time to the scheduled exit date and time, which were input by the user at the time of reservation for using the parking lot PA (that is, parking reservation) as the scheduled parking time, and acquires the information indicating the scheduled parking time derived. Information indicating the scheduled entry date and time and the scheduled exit date and time can be acquired from the navigation device 40 and the terminal device 300 used by the user at the time of parking reservation, the parking lot management device 400 of the parking lot PA where the parking reservation was made, and the like.

The processing unit 620 includes a rewriting processing unit 621 that executes the rewriting process fix rewriting the software of the vehicle M. The rewriting processing unit 621 executes the rewriting process while the vehicle M is stopped at a predetermined position, that is, while the vehicle M is parked in the parking lot PA. As a result, the software of the vehicle M can be rewritten while the vehicle M is parked in the parking lot PA, that is, during a period when the user is not expected to use the vehicle M.

Specifically, the rewriting processing unit 621 first inquires whether the vehicle M is parked in the parking lot PA with respect to other devices such as the navigation device 40 and the automatic driving control device 100 that can specify the position of the vehicle M. As a result of the inquiry, if the vehicle M is parked in the parking lot PA, the rewriting processing unit 621 determines whether to execute the rewriting process based on the information indicating the required time acquired by the required time acquisition unit 611 and the information indicating the scheduled parking time acquired by the scheduled stop time acquisition unit 612.

For example, if the required time is shorter than the scheduled parking time, the rewriting processing unit 621 determines that the rewriting process is to be executed and executes the rewriting process. As a result, the rewriting processing unit 621 can execute the rewriting process and complete the rewriting process while the vehicle M is parked in the parking lot PA. Therefore, the software of the vehicle M can be rewritten while the vehicle M is parked in the parking lot PA, that is, during the period when the user is not expected to use the vehicle M, and the software of the vehicle M can be rewritten while avoiding the deterioration of the user convenience.

On the other hand, if the required time is longer than the scheduled parking time, the rewriting processing unit 621 determines that the rewriting process is not to be executed and does not execute the rewriting process. As a result, if the rewriting process cannot be completed while the vehicle M is parked in the parking lot PA, the rewriting processing unit 621 can restrict the execution of the rewriting process during the period. Therefore, for example, it is possible to avoid a situation occurs in which the software of the vehicle M is being rewritten and a part or all of the vehicle system 1 cannot be used when the user tries to use the vehicle M to leave the parking lot PA, and the user convenience can be prevented from being deteriorated.

However, rewriting the software of the vehicle M without the permission of the user may cause distrust or discomfort of the user. Therefore, it is desirable that the rewriting processing unit 621 executes the rewriting process on the condition that the user permits. Specifically, here, before the vehicle M is parked in the parking lot PA (for example, at the time of parking reservation), the user performs an operation to select whether to execute the rewriting process, using the input and output devices 20 and 42 and the like.

Then, the rewriting processing unit 621 executes the rewriting process when the user performs an operation to execute the rewriting process. As a result, the software of the vehicle M can be rewritten without causing distrust or discomfort to the user. On the other hand, the rewriting processing unit 621 prevents the rewriting process from being executed when the user performs an operation not to execute the rewriting process. As a result, it is possible to prevent the rewriting of the software of the vehicle M that leads to distrust and discomfort of the user.

Further, as described above, the rewriting process is, for example, a process of rewriting the software downloaded (that is, received) from the software distribution server 500. If software from the software distribution server 500 is attempted to be downloaded in a position where the communication environment between the software rewriting device 60 and the software distribution server 500 is poor (for example, a position where the intensity of the radio wave of the network 35 is weak), the download itself cannot be performed or it takes time although the software can be downloaded. Therefore, if the rewriting process is performed at a position where the communication environment between the software rewriting device 60 and the software distribution server 500 is poor, the rewriting process may not be completed smoothly.

Therefore, it is desirable that the rewriting processing unit 621 performs the rewriting process when the communication environment in the parking lot PA, more specifically, the communication environment of the parking space PS where the vehicle M performing the rewriting process is parked is at a predetermined level or higher. Here, when the communication environment is at a predetermined level or higher, for example, the intensity of the radio wave (for example, the radio wave of the network 35) used by the communication device 30 for communication is strong enough so that the software used for the rewriting process can be smoothly downloaded from the software distribution server 500. The rewriting processing unit 621 can determine whether the communication environment is at a predetermined level or higher, for example, based on the detection result of the radio wave intensity sensor included in the vehicle sensor 14. Further, instead of the communication environment at a predetermined level or higher, the communication speed of a communicable (available) communication line (for example, network 35) may be at a predetermined speed or higher.

As such, in a situation where the rewriting process is executed when the communication environment in the parking lot PA is at a predetermined level or higher, thereby allowing the software of the vehicle M to be smoothly downloaded from the software distribution server 500 and the rewriting process to be smoothly executed, the rewriting process can be executed to rewrite the software of the vehicle M. On the other hand, in a situation where the software of the vehicle M cannot be smoothly downloaded from the software distribution server 500 and the rewriting process is expected to take a long time because the communication environment in the parking lot PA is below a predetermined level, it is possible to prevent the rewriting process from being performed.

Further, even if the communication environment in the parking lot PA is below a predetermined level, it is conceivable that the rewriting process can be smoothly performed if the download of the vehicle M used for the rewriting process is completed before the vehicle M is parked in the parking lot PA. Therefore, even if the communication environment in the parking lot PA, more specifically, the communication environment of the parking space PS where the vehicle M performing the rewriting process is parked is below a predetermined level, the rewriting processing unit 621 may allow the rewriting process to be executed if the download of the software used for the rewriting process has been completed before the vehicle M is parked in the parking lot PA. As a result, the rewriting process can be executed even if the communication environment is below a predetermined level, and the opportunity for rewriting the software of the vehicle M can be increased.

However, as described above, the parking lot PA is an automatic valet parking type parking lot, and the parking lot management device 400 may change the parking position (that is, the parking space PS) of a vehicle parked in the parking lot PA as appropriate from the viewpoint of effectively utilizing the parking lot PA. For example, when a vehicle of a special size or a special type enters the parking lot PA, although the special vehicle cannot be parked in the currently vacant parking space PS, the special vehicle may be able to be parked by moving another parked vehicle to another parking space PS. In such a case, the parking lot management device 400 moves a parked vehicle to another parking space PS (that is, changes the parking position). Changing the parking position of a parked vehicle as such is also referred to as re-parking in the below.

In addition, re-parking may be performed in response to a request from a parked vehicle. For example, it is conceivable that the parking lot PA has a position where the communication environment is at a predetermined level or higher (for example, the parking space PS with the parking space ID "001" in FIG. 5) and a position where the communication environment is below the predetermined level (for example, the parking space PS with the parking space ID "003" in FIG. 5).

Therefore, when the rewriting processing unit 621 executes the rewriting process, if the vehicle M is parked at a position where the communication environment is below the predetermined level, the rewriting processing unit 621 may request the parking lot management device 400 via the communication unit 630 to guide (guidance) to a position where the communication environment is at the predetermined level or higher. Here, the parking lot management device 400 performs re-parking to move the vehicle M to a position where the communication environment is at a predetermined level or higher in response to the request from the vehicle M. As a result, the vehicle M to perform the rewriting process can be parked at an appropriate position for the rewriting process and the opportunity to perform the rewriting process can be increased.

Further, from the viewpoint of parking the vehicle M to perform the rewriting process at an appropriate position for performing the rewriting process, the rewriting processing unit 621 may request the parking lot management device 400 via the communication unit 630 to guide (guidance) the vehicle M to a position where an energy source can be supplied when executing the rewriting process. As a result, it is possible to supply the energy source to the vehicle M and perform the rewriting process, which makes it possible to prevent the occurrence of a situation in which the energy source of the vehicle M is exhausted during the rewriting process and the software cannot be rewritten normally.

Further, as described above, the parking lot management device 400 appropriately gives instructions such as re-parking to each vehicle parked in the parking lot PA. However, if the vehicle receiving the instruction from the parking lot management device 400 is rewriting the software, the vehicle cannot communicate with the parking lot management device 400 or cannot move in response to the instruction from the parking lot management device 400. In such a case, there is a possibility that the parking lot management device 400 detects an error (that is, detects that an error has occurred in the parking lot PA) based on the existence of a vehicle that cannot communicate with the parking lot management device 400 or does not move in response to the instruction from the parking lot management device 400.

In order to prevent such erroneous detection of an error in the parking lot management device 400, the rewriting processing unit 621 desirably notifies the parking lot management device 400 via the communication unit 630 that the rewriting process will be executed when the rewriting process is executed. As a result, the parking lot management device 400 can be notified in advance that the rewriting process will be executed. For example, even if the vehicle M cannot communicate with the parking lot management device 400 or move due to the execution of the rewriting process, it is possible to prevent the parking lot management device 400 from detecting an error based on the above.

Further, when the rewriting process has been completed, the rewriting processing unit 621 desirably notifies the parking lot management device 400 via the communication unit 630 that the rewriting process has been completed. As a result, the parking lot management device 400 can be notified that the rewriting process has been completed. For example, after receiving the notification, the parking lot management device 400 treats the vehicle M that has undergone the rewriting process in the same manner as other vehicles. The parking lot PA can be effectively utilized by appropriately performing re-parking.

Further, when the rewriting processing unit 621 executes the rewriting process, the rewriting processing unit 621 may notify the user terminal device 300 via the communication unit 630 that the rewriting process is to be executed. As a result, the user can be notified in advance that the rewriting process will be executed. For example, the user can act after knowing that the vehicle M cannot be used for a while, which improves user convenience.

Further, when the rewriting process is completed, the rewriting processing unit 621 may notify the terminal device 300 of the user via the communication unit 630 that the rewriting process has been completed. As a result, the user can be notified that the rewriting process has been completed. For example, the user can act after knowing that the vehicle M has become available, which improves user convenience.

Further, when the software of the vehicle M is rewritten by the rewriting process, it is desirable to verify whether the vehicle M operates normally by the rewritten software from the viewpoint of ensuring the safety and convenience of the user.

Therefore, the processing unit 620 includes, for example, a verification processing unit 622 that causes the vehicle M to perform a test operation using the software rewritten by the rewriting process. Specifically, the verification processing unit 622 causes the vehicle M to perform a test operation using the software rewritten by the rewriting process after the rewriting process by the rewriting processing unit 621, in the parking lot PA.

For example, the verification processing unit 622 causes the vehicle M that has undergone the rewriting process to temporarily exit the parked parking space PS and perform a test operation of parking the vehicle M in the parking space PS again. That is, the test operation includes an operation of moving the vehicle M that has undergone the rewriting process from the parking space PS. It is possible to verify whether the vehicle M that has undergone the rewriting process can be moved from the parking space PS. In addition, the test operation includes an operation of stopping the vehicle M that has undergone the rewriting process in the parking space PS. It is possible to verify whether the vehicle M that has the rewriting process can be stopped in the parking space PS. By such a test operation, it is possible to verify whether the vehicle M that has undergone the rewriting process can correctly be parked in the predetermined parking space PS even after the rewriting process.

The verification processing unit 622 determines that the test operation result is good (that is, there is no problem even if the rewritten software is enabled) when the vehicle M can be correctly parked again at the parking space PS where the vehicle M has been parked. Then, the verification processing unit 622 enables the rewritten software based on the determination that the test operation result is good as such. As a result, the safety and convenience of the user can be ensured.

On the other hand, when the vehicle M cannot be correctly parked in the parked parking space PS (for example, when the parking position shifts), the verification processing unit 622 determines that the test operation result is poor (that is, if the rewritten software is enabled, a problem may occur). As a result, it is possible to prevent the user from enabling software that can deteriorate the safety and convenience of the user.

Further, the software rewriting device 60 may allow the user to perform an operation as to whether to enable the rewritten software when the operation result of the test operation is good. Specifically, here, the software rewriting device 60 sends a notification that the operation result of the test operation is good to the terminal device 300 so that the user is notified, and makes the user perform an operation as to whether to enable the software rewritten by using the input and output device 310. Then, the software rewriting device 60 enables the rewritten software when the user performs an operation to enable the rewritten software. As a result, the software rewritten on the condition of the user's permission can be enabled, and it is possible to prevent the user from feeling distrust or discomfort by enabling the software without permission.

Further, after rewriting the software, it may take a certain period of time for the operation of the vehicle M to stabilize. Therefore, the software rewriting device 60 may enable the rewritten software after the vehicle M leaves the parking lot PA when the user performs an operation to enable the rewritten software. For example, when the software is rewritten, the vehicle M may learn using the rewritten software through traveling in the parking lot PA (for example, traveling to leave the parked parking space PS). Therefore, by enabling the software rewritten after the traveling (that is, learning) in the parking lot PA is completed and the vehicle leaves the parking lot PA, the rewritten software can be enabled after the operation of the vehicle M becomes stable.

Further, the verification processing unit 622 may make the vehicle M perform a test operation when no person is on board. Here, the verification processing unit 622 performs a test operation, for example, when there is no key of the vehicle M in the vehicle or when it is recognized that no person is on the vehicle M based on the image captured by the camera that captures the inside of the vehicle. As a result, the test operation can be performed while ensuring the safety of the user.

Next, an example of the functional configuration of the parking lot management device 400 will be described with reference to FIG. 4. As described above, when the vehicle M to perform the rewriting process in the parking lot PA is parked in an appropriate parking position for rewriting, for example, a parking position where the communication environment is at a predetermined level or higher, the possibility of executing the rewriting process in the parking lot PA increases. Therefore, the parking lot management device 400 causes the vehicle M to perform the rewriting process in the parking lot PA to park at an appropriate parking position.

Figures 4, 5:
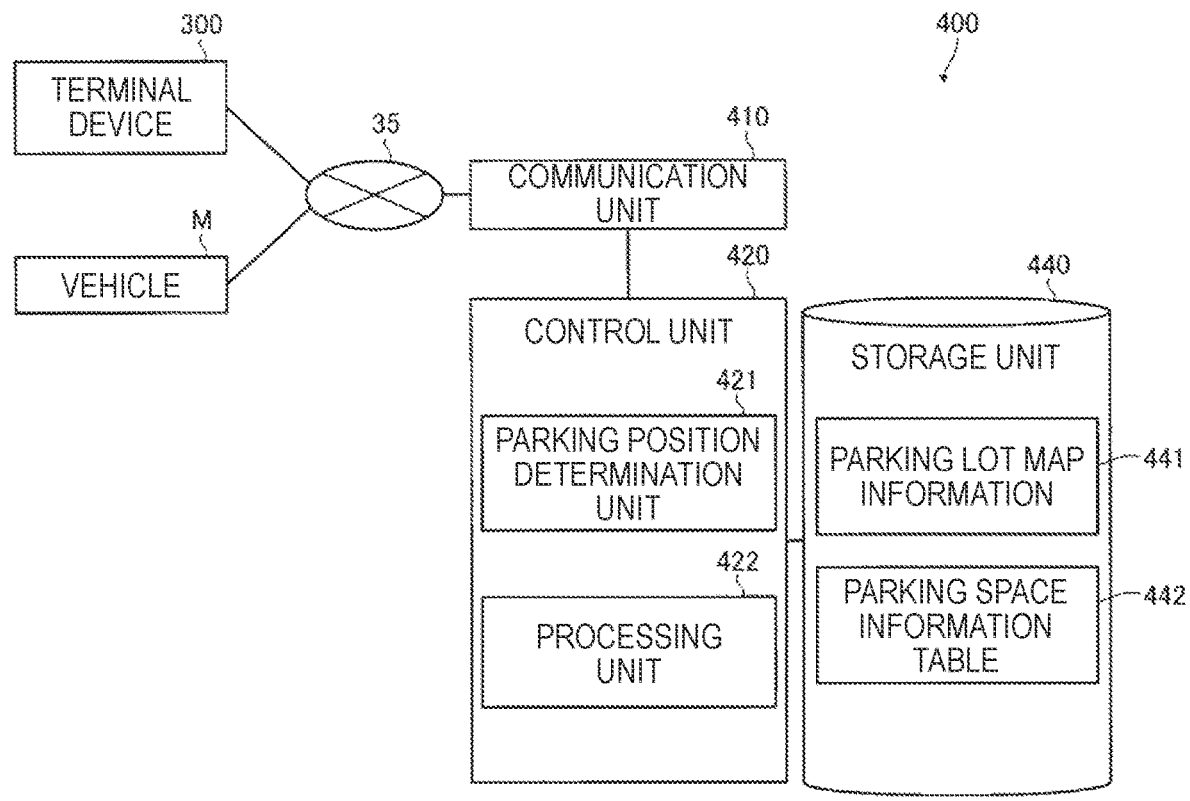
FIG. 4 is a diagram showing an example of a functional configuration of the parking lot management device.
FIG. 5 is a diagram showing an example of a parking space information table.

Specifically, as shown in FIG. 4, the parking lot management device 400 includes a communication unit 410, a control unit 420, and a storage unit 440. The communication unit 410 and the control unit 420 of the parking lot management device 400 are realized, for example, by a central processing unit (CPU) executing a predetermined program (software) stored in advance. Some or all of the functional units may be realized by hardware such as large scale integration (LSI), application specific integrated circuit (ASIC), field-programmable gate array (FPGA), and graphics processing unit (GPU), or may be realized by the cooperation of software and hardware.

Further, the storage unit 440 is realized by various storage devices such as an HDD and a flash memory, and stores various information such as parking lot map information 441 and a parking space information table 442, for example. The parking lot map information 441 is information that geometrically represents the structure of the parking lot PA, and includes, for example, information indicating the coordinates (positions) of the respective parking spaces PS provided in the parking lot PA.

The parking space information table 442 stores information indicating the type and parking status of each parking space PS provided in the parking lot PA. Specifically, as shown in FIG. 5, the parking space information table 442 stores, for example, information indicating the type of parking space PS identified by the parking space ID with respect to the parking space ID which is the identification information of the parking space PS, and the parking information indicating the parking status of the parking space PS identified by the parking space ID in association with each other.

In the parking space information table 442, the information indicating the type of the parking space PS includes, for example, information indicating whether the energy source can be supplied and information indicating the communication environment. The parking space PS where the information of "possible" is stored as the information indicating whether the energy source can be supplied is a parking space PS where the energy source used when the vehicle M operates can be supplied to the vehicle M. For example, when the vehicle M is an electric vehicle, the parking space PS where the information of "possible" is stored as the information indicating whether the energy source can be supplied is a parking space PS provided with equipment capable of supplying power to the vehicle M. On the other hand, the parking space PS where "not possible" information is stored as the information indicating whether the energy source can be supplied is a parking space PS that does not have equipment capable of supplying the energy source to the vehicle M (for example, equipment that can supply power).

The parking space PS where "strong" information is stored as the information indicating the communication environment is a parking space PS where the communication environment between the vehicle M and the software distribution server 500 is at a predetermined level or higher. For example, the parking space PS where "strong" information is stored as the information indicating the communication environment is a parking space PS where the intensity of the radio wave used for the network 35 is strong to the extent that the vehicle M (software rewriting device 60) can smoothly download the software from the software distribution server 500. On the other hand, the parking space PS where "weak" information is stored as the information indicating the communication environment is a parking space PS where the intensity of the radio wave used for the network 35 is weak and the vehicle M (software rewriting device 60) is difficult to smoothly download the software from the software distribution server 500. Although an example in which the intensity of the radio wave is used as the communication environment has been described here, the present invention is not limited thereto. The communication environment may be determined based on, for example, the communication speed of a communication line capable of communicating (available) at that location.

In the parking space information table 442, the parking information includes, for example, information indicating whether there is a parked vehicle in each corresponding parking space PS, and information indicating a parked vehicle. As the information indicating whether there is a parked vehicle, for example, "full" indicating that there is a parked vehicle or "empty" indicating that there is no parked vehicle is stored. As the information indicating a parked vehicle, the information indicating the vehicle ID that identifies the parked vehicle in the parking space PS is stored.

The communication unit 410 communicates with the vehicle M wirelessly (for example, the network 35). The communication unit 410 may also communicate with the user's terminal device 300. The control unit 420 determines the parking position of the vehicle M based on the information acquired via the communication unit 410 and the information stored in the storage unit 440 and guides the vehicle M to the determined parking position.

Specifically, the control unit 420 includes a parking position determining unit 421 and a processing unit 422. The parking position determination unit 421 determines the parking position of the vehicle M based on whether the vehicle M rewrites the software in the parking lot PA. That is, the parking position determination unit 421 can make the parking position different depending on whether the vehicle M rewrites the software in the parking lot PA or does not rewrite the software.

For example, as will be described later, when the vehicle M enters the parking lot PA, the vehicle M transmits the vehicle information regarding the vehicle M to the parking lot management device 400. The vehicle information includes information indicating whether to execute the rewriting process in the parking lot PA. As a result, the vehicle M can notify the parking lot management device 400 whether to execute the rewriting process in the parking lot PA.

Then, when the parking position determination unit 421 receives a notification to execute the rewriting process from the vehicle M, that is, when the communication unit 410 receives the vehicle information indicating that the rewriting process is to be executed, the parking position determination unit 421 determines the parking position of the vehicle M to be a parking space PS where the communication environment between the vehicle M and the software distribution server 500 is at a predetermined level or higher.

Specifically, the parking position determination unit 421 determines a parking space PS where the information indicating the communication environment is "strong" and the parking information is "empty" as the parking position of the vehicle M to perform the rewriting process, with reference to the parking space information table 442. As a result, it is possible to stop the vehicle M that performs the rewriting process in a parking space PS whose communication environment is at a predetermined level or higher and increase the possibility that the vehicle M can perform the rewriting process.

Further, if the enemy source of the vehicle M is exhausted during the rewriting process and the execution of the rewriting process is interrupted, the software cannot be normally rewritten by the rewriting process. Therefore, it is desirable that the vehicle M to perform the rewriting process is stopped at a parking position capable of supplying the energy source, and the rewriting process is performed while supplying the energy source.

Therefore, when the parking position determination unit 421 receives a notification to execute the rewriting process from the vehicle M, that is, when the communication unit 410 receives the vehicle information indicating that the rewriting process will be executed, the parking position determination unit 421 determines the parking position of the vehicle M to be a parking space PS that can supply an energy source to the vehicle M.

Specifically, the parking position determination unit 421 determines a parking space PS where the information indicating whether the energy source can be supplied is "possible" and the parking information is "empty" as the parking position of the vehicle M to perform the rewriting process, with reference to the parking space information table 442. As a result, it is possible to stop the vehicle M to perform the rewriting process in a parking space PS capable of supplying the energy source and increase the possibility that the vehicle M can perform the rewriting process.

Further, there may be another vehicle (for example, another vehicle performing the rewriting process) parked at the parking space PS suitable for the rewriting process, such as a parking space PS where the communication environment between the vehicle M and the software distribution server 500 is at a predetermined level or higher, or a parking space PS capable of supplying an energy source to the vehicle M. In such a case, the parking position determination unit 421 determines, for example, the parking position of the vehicle M that has notified that the rewriting process is to be executed to another parking space PS that is vacant at that time. As a result, even if there is another vehicle parked in the parking space PS suitable for the rewriting process, the vehicle M that has notified that the rewriting process is to be executed can enter the parking lot PA.

However, if the parking position of the vehicle M that has notified that the rewriting process is to be executed is determined to another parking space PS that is vacant at that time (a parking space PS that is not suitable for performing the rewriting process), the parking lot management device 400 restricts the vehicle M from performing the rewriting process by instructing the vehicle M not to perform the rewriting process. As a result, it is possible to prevent the rewriting process that may not be completed normally from being performed.

Further, when another vehicle parked in the parking space PS suitable for the rewriting process moves from the parking space PS, the parking lot management device 400 may move the vehicle M that has notified that the rewriting process is to be executed to the parking space PS and allow the rewriting process to be executed. As a result, the vehicle M that has notified that the rewriting process is to be executed can be moved to the parking space PS suitable for performing the rewriting process that has become empty, and the rewriting process can be appropriately performed.

Further, as described above, if the software used for the rewriting process has been downloaded before the vehicle M to perform the rewriting process enters the parking lot PA, the rewriting process can be performed stably regardless of the communication environment of the parking position in the parking lot PA. Therefore, it is less necessary to allocate a parking space PS having a good communication environment to such a vehicle M. Rather, from the viewpoint of effectively utilizing the parking lot PA, it may be better to allocate a parking space PS having a poor communication environment to such a vehicle M.

Therefore, for example, the vehicle M transmits the vehicle information including information indicating whether the software used for the rewriting process has been downloaded to the parking lot management device 400, thereby notifying the parking lot management device 400 whether the software used for the rewriting process has been downloaded. Here, if there is a notification from the vehicle M that the software used for the rewriting process has been downloaded, the parking position determination unit 421 determines the parking position of the vehicle M in the parking space PS where the communication environment between the vehicle M and the software distribution server 500 is below a predetermined level.

Specifically, the parking position determination unit 421 determines a parking space PS where the information indicating the communication environment is "weak" and the parking information is "empty" as the parking position of the vehicle M to perform the rewriting process, with reference to the parking space information table 442. As a result, the limited parking spaces PS having a communication environment at a predetermined level or higher can be allocated to other vehicles for which the software used for the rewriting process has not been downloaded, and the parking lot PA can be effectively utilized.

Further, when the remaining energy of the vehicle M to perform the rewriting process is sufficient, it is less necessary to allocate a parking space PS capable of supplying the energy source to the vehicle M. Rather, from the viewpoint of effectively utilizing the parking lot PA, it may be better to allocate a parking space PS that cannot supply an energy source to such a vehicle M.

Therefore, for example, the vehicle M transmits the vehicle information including the information indicating the remaining energy to the parking lot management device 400, thereby notifying the parking lot management device 400 of the remaining energy. Here, when the remaining energy of the vehicle M to perform the rewriting process is equal to or more than a predetermined amount, the parking position determination unit 421 determines the parking position of the vehicle M to a parking space PS where the energy source cannot be supplied.

Specifically, the parking position determination unit 421 determines a parking space PS where the information indicating whether the energy source can be supplied is "not possible" and the parking information is "empty" as the parking position of the vehicle M to perform the rewriting process, with reference to the parking space information table 442. As a result, the limited parking spaces PS that can supply an energy source can be allocated to other vehicles having the remaining energy below a predetermined amount, and the parking lot PA can be effectively utilized.

The processing unit 422 acquires the position of the parking space PS where each vehicle M has to be parked in the parking lot PA from the parking lot map information 441, and transmits a suitable route to the acquired position of the parking space PS to the vehicle M via the communication unit 410. In the vehicle M that has received the route, the action plan generation unit 130 generates a target track based on the received route, and the action control unit 140 controls the vehicle M to act according to the action plan generated by the action plan generation unit 130. As a result, the vehicle M is guided to the parking space PS determined by the parking lot management device 400 and parked in the parking space PS.

Meanwhile, as an automatic valet parking type parking lot such as the parking lot PA, a plurality of types of parking lots in which the automatic driving performance required for a vehicle for parking is different can be considered. As a first type of automatic valet parking type parking lot, for example, it is possible to consider a parking lot in which a parking lot management device that manages the parking lot determines a parking position and a route to the parking position, and guides the vehicle to the parking position along the route.

Further, as a second type of automatic valet parking type parking lot, for example, it is possible to consider a parking lot in which a parking lot management device that manages the parking lot determines only the parking position, the determination of a route to the parking position and the move to the parking position by the route are performed autonomously by the vehicle. In order to park in such a parking lot of the second type automatic valet parking type, the vehicle is required to have higher automatic driving performance than the parking lot of the first type automatic valet parking type. Specifically, it is required to have a function of determining a route to the parking position and autonomously moving to the parking position along the route. That is, the parking lot of the second type automatic valet parking type has more vehicle tasks (for example, the above-mentioned driving task) than the parking lot of the first type automatic valet parking type.

Therefore, for example, a vehicle, which can move to the parking position along the route determined by the parking lot management device hut cannot determine the route to the parking position nor autonomously move to the parking position along the route, can be parked in the first type automatic valet parking type of parking lot but cannot be parked in the second type automatic valet parking type parking lot. As such, the parking lots where the vehicle can be parked may differ depending on the automatic driving performance of the vehicle.

In the meantime, when the software of the vehicle M is rewritten, a new function (for example, a function of determining a route to the parking position and a function of autonomously moving to the parking position along the route) may be added to the vehicle M, thereby improving the automatic operation performance of the vehicle M. Then, if the automatic driving performance of the vehicle M is improved, the number of parking lots where the vehicle M can be parked can increase. Therefore, from the viewpoint of improving the commercial value of the vehicle M and user convenience, it is desired to prompt the rewriting of the software of the vehicle M.

Therefore, in the present embodiment, the navigation device 40 functions as a notification device for notifying the parking lot where the vehicle M can be parked, and the notification urges the user to rewrite the software of the vehicle M.

As shown in FIG. 1, the navigation device 40 includes the first performance acquisition unit 44, the second performance acquisition unit 45, and the processing unit 46. The first performance acquisition unit 44 acquires information indicating the current performance of the vehicle M. The first performance acquisition unit 44 acquires, for example, information indicating the current automatic driving performance of the vehicle M from the automatic driving control device 100 or the like. The information indicating the automatic driving performance can be information indicating the type of parking lot where the vehicle M can be parked, such as the above-mentioned "first type" and "second type". Information indicating the current automatic driving performance of the vehicle M is preset in the automatic driving control device 100, and the automatic driving control device 100 sends information indicating the set current automatic driving performance of the vehicle M to the navigation device 40 in response to the request from the navigation device 40.

The second performance acquisition unit 45 acquires information indicating the changed performance of the vehicle M, which changes by rewriting the software of the vehicle M. The second performance acquisition unit 45 acquires, for example, information indicating the changed automatic driving performance of the vehicle M, which changes by rewriting the software of the vehicle M, from the software distribution server 500 or the like. The software distribution server 500 is preset with information indicating the automatic driving performance after rewriting in the software together with the software of the vehicle M, and the software distribution server 500 sends the information indicating the set automatic driving performance after rewriting to the navigation device 40 in response to the request from the navigation device 40.

The processing unit 46 includes the notification unit 47. The processing unit 46 and the notification unit 47 are examples of the first determination unit, the second determination unit, and the notification unit in the present invention. The notification unit 47 notifies a parking lot where the vehicle M can be parked based on the information indicating the current performance acquired by the first performance acquisition unit 44 and the information indicating the changed performance acquired by the second performance acquisition unit 45. Specifically, the notification unit 47 separately notifies a parking lot where parking is possible with the current automatic driving performance of the vehicle M and a parking lot where parking is possible with the changed automatic driving performance. As a result, it is possible to notify the user how the parking lots where parking is possible are changed by rewriting the software of the vehicle M, and it is possible to prompt the rewriting of the software of the vehicle M. An example of separately notifying a parking lot where parking is possible with the current automatic driving performance of the vehicle M and a parking lot where parking is possible with the changed automatic driving performance will be described later with reference to FIG. 12.

Further, the notification unit 47 may perform the above notification, for example, when the user performs an operation of searching for a parking lot where the vehicle M can be parked. As a result, the above notification can be performed at the timing when the user is interested in the parking lot where the vehicle M can be parked. That is, the above notification can be effectively performed and the rewriting of the software of the vehicle M can be prompted.

Further, for example, the software may be rewritten when the vehicle M is parked in the first type parking lot, and as a result, the vehicle M may be able to park in the second type parking lot. In other words, the second type parking lot is a parking lot in which the above-mentioned driving task performed by the vehicle M is more than that of the first type parking lot. Then, from the viewpoint of user convenience, it may be preferable that the vehicle M is parked in the second type parking lot.

Therefore, when the software is rewritten when the vehicle M is parked in the first type parking lot, after rewriting the software, the processing unit 46 may perform an operation as to whether to move the vehicle M to a parking lot where parking is possible with the changed performance. Then, when an operation to move to a parking lot where parking is possible with the changed performance is received from the user, after rewriting the software, the vehicle M moves to a parking lot where parking is possible with the changed performance, autonomously or in cooperation with the parking lot management device of the parking lot as a moving destination. As a result, user convenience can be improved.

Further, the software of the vehicle M may have a validity period set. Therefore, when the software is rewritten, the processing unit 46 may allow the user to perform an operation to set the validity period of the software to a first period (for example, one day) or a second period (for example, one year) longer than the first period. When the operation to set the validity period of the software as the first period is received, the vehicle M sets the validity period of the rewritten software to the first period. On the other hand, when the operation to set the validity period of the software as the second period is received, the vehicle M sets the validity period of the rewritten software to the second period. As a result, the validity period can be set as desired by the user and the user convenience can be improved.

Processing Performed by Software Rewriting Device

Rewriting Reservation Process

Next, an example of the processing performed by the software rewriting device 60 will be described. First, the rewriting reservation process performed by the software rewriting device 60 will be described with reference to FIG. 6. The software rewriting device 60, for example, performs the rewriting reservation process shown in FIG. 6 at a predetermined cycle.

Figure 6:
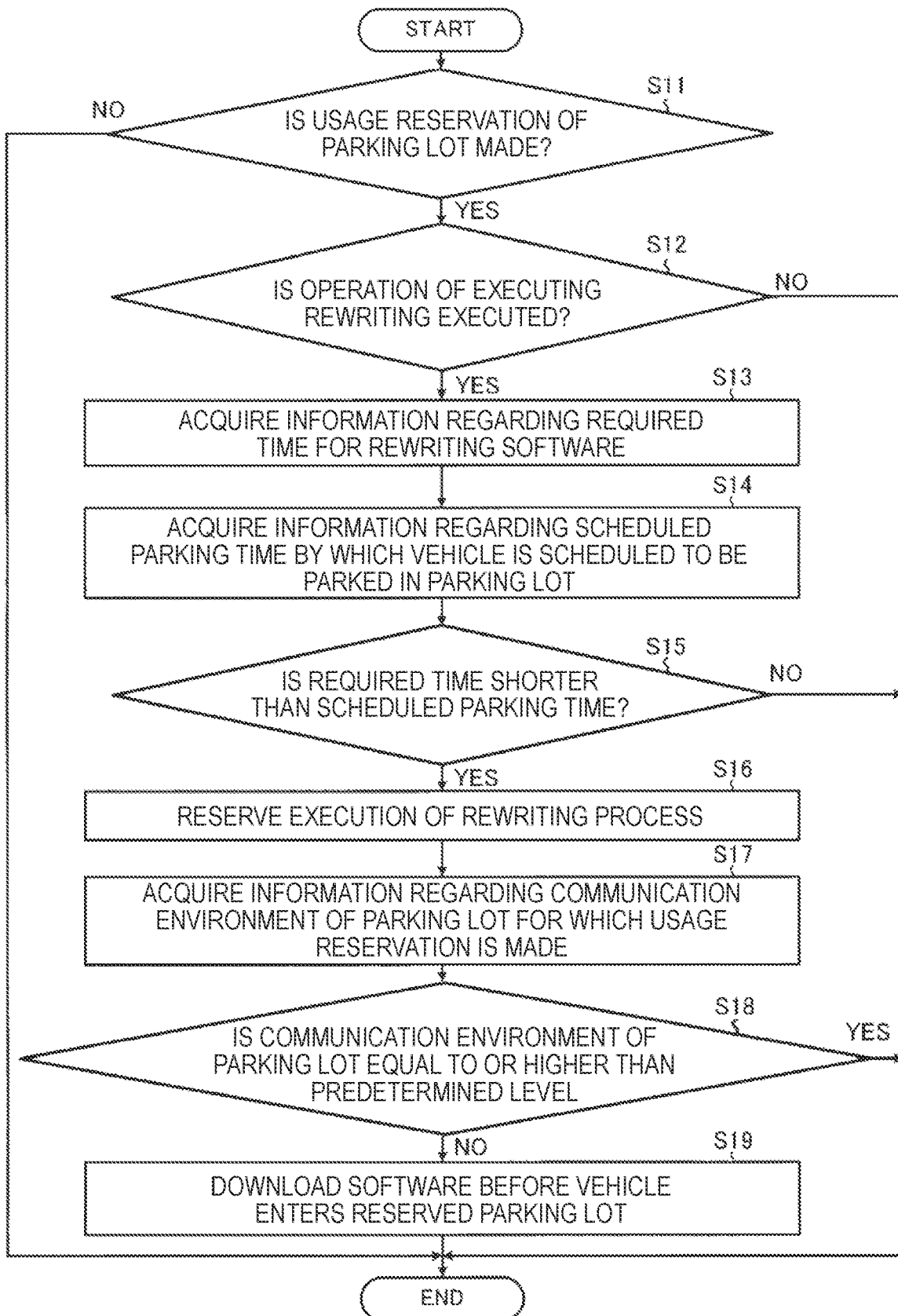
FIG. 6 is a diagram showing an example of a functional configuration of a navigation device.

As shown in FIG. 6, in the rewriting reservation process, the software rewriting device 60 determines whether a usage reservation of the parking lot PA has been made (step S11). When it is determined that a usage reservation of the parking lot PA has not been made (NO in step S11), the software rewriting device 60 ends the rewriting reservation process shown in FIG. 6 as it is.

When it is determined that a usage reservation of the parking lot PA has been made (YES in step S11), the software rewriting device 60 determines whether an operation to execute the rewriting process has been performed at the time of the usage reservation (YES in step S12). When it is determined that the operation to execute the rewriting process has not been performed (NO in step S12), the software rewriting device 60 ends the rewriting reservation process shown in FIG. 6 as it is.

When it is determined that the operation to execute the rewriting process has been performed (YES in step S12), the software rewriting device 60 acquires information indicating the time required to rewrite the software by the rewriting process (step S13). Next, the software rewriting device 60 acquires information indicating the scheduled parking time scheduled to be parked in the parking lot PA for which the usage reservation has been made (step S14).

Then, the software rewriting device 60 determines whether the required time is shorter than the scheduled parking time based on the information indicating the required time acquired in step S13 and the information indicating the scheduled parking time acquired in step S14 (Step S15). If it is determined that the required time is longer than the scheduled parking time (NO in step S15), the software rewriting device 60 ends the rewriting reservation process shown in FIG. 6 as it is.

If it is determined that the required time is shorter than the scheduled parking time (YES in step S15), the software rewriting device 60 reserves the execution of the rewriting process so that the rewriting process is executed when the vehicle M is parked in the parking lot PA for which the usage reservation has been made (step S16). In step S16, the software rewriting device 60, for example, stores information indicating that the rewriting process is to be executed when the vehicle M enters the parking lot PA based on the usage reservation in a storage device (not shown) provided in the own device.

Next, the software rewriting device 60 acquires information indicating the communication environment of the parking lot PA for which the usage reservation has been made (step S17). For example, the first map information 43 stored in the navigation device 40 includes information indicating the communication environment of each parking lot. Then, in step S17, the software rewriting device 60 acquires information indicating the communication environment of the parking lot PA from the navigation device 40. Further, the software rewriting device 60 may acquire information indicating the communication environment of the parking lot PA from the parking lot management device 400 via the communication device 30 or the like.

Next, the software rewriting device 60 determines whether the communication environment of the parking lot PA is at a predetermined level or higher based on the information indicating the communication environment acquired in step S17 (step S18). Then, when it is determined that the communication environment of the parking lot PA is at a predetermined level or higher (YES in step S18), the software rewriting device 60 ends the rewriting reservation process shown in FIG. 6 as it is.

On the other hand, when it is determined that the communication environment of the parking lot PA is below a predetermined level (NO in step S18), the software rewriting device 60 downloads the software used for the rewriting process from the software distribution server 500 before the vehicle M enters the parking lot PA based on the usage reservation (step S19), and ends the rewriting reservation process shown in FIG. 6. For example, when the software used for the rewriting process is downloaded from the software distribution server 500, the software rewriting device 60 stores the downloaded software in a storage device provided in its own device in association with the information indicating that the rewriting process stored in step S16 is to be executed.

Rewriting Execution Process

Next, the rewriting execution process performed by the software rewriting device 60 will be described with reference to FIG. 7. The software rewriting device 60, for example, performs the rewriting execution process shown in FIG. 7 at a predetermined cycle.

Figure 7:
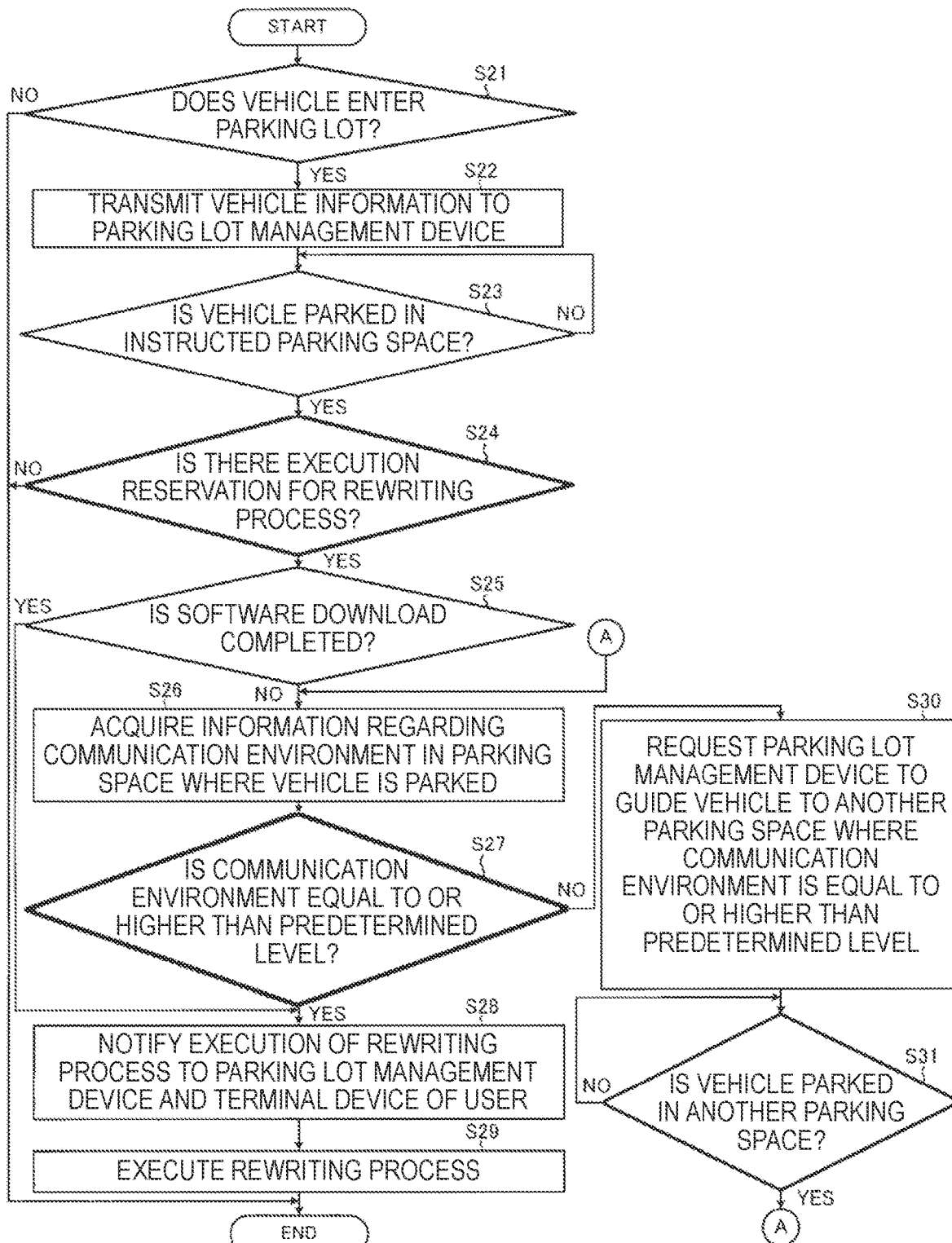
FIG. 7 is a flowchart showing an example of a rewriting reservation process performed by the software rewriting device.

As shown in FIG. 7, in the rewriting execution process, the software rewriting device 60 determines whether the vehicle M has entered the parking lot PA for which the usage reservation was made (step S21). When it is determined that the vehicle M has not entered the parking lot PA for which the usage reservation was made (NO in step S21), the software rewriting device 60 ends the rewriting execution process shown in FIG. 7 as it is.

When it is determined that the vehicle M has entered the parking lot PA for which the usage reservation was made (YES in step S21), the software rewriting device 60 transmits the vehicle information regarding the vehicle M to the parking lot management device 400 of the parking lot PA where the vehicle M has entered (step S22). The vehicle information includes, for example, information indicating whether the rewriting process is to be executed in the parking lot PA, whether the software used for the rewriting process has been downloaded in the case of executing the rewriting process, the remaining energy of the vehicle M, and the like.

Therefore, the software rewriting device 60 can notify the parking lot management device 400 whether to execute the rewriting process in the parking lot PA, whether the software used for the rewriting process has been downloaded in advance in the case of executing the rewriting process, the remaining energy of the vehicle M, and the like, by transmitting the vehicle information to the parking lot management device 400.

Next, the software rewriting device 60 determines whether the vehicle M is parked in the parking space PS instructed by the parking lot management device 400 (step S23). If the vehicle M is not parked in the parking space PS (NO in step S23), the software rewriting device 60 waits until the vehicle M is parked.

Then, when the vehicle M is parked in the parking space PS instructed by the parking lot management device 400 (YES in step S23), the software rewriting device 60 determines whether there is an execution reservation to execute the rewriting process in the parking lot PA (step S24). When it is determined that there is no execution reservation for the rewriting process (NO in step S24), the software rewriting device 60 ends the rewriting execution process shown in FIG. 7 as it is.

When it is determined that there is an execution reservation for the rewriting process (YES in step S24), the software rewriting device 60 determines whether the software used for the rewriting process has been downloaded (step S25). When it is determined that the software used for the rewriting process has been downloaded (YES in step S25), the software rewriting device 60 shifts to the process in step S28.

On the other hand, when it is determined that the software used for the rewriting process has not been downloaded (NO in step S25), the software rewriting device 60 acquires information indicating the communication environment in the parking space PS where the vehicle M is parked (step S26). Then, the software rewriting device 60 determines whether the communication environment in the parking space PS where the vehicle M is parked is at a predetermined level or higher based on the information indicating the communication environment acquired in step S26 (step S27).

When it is determined that the communication environment in the parking space PS where the vehicle M is parked is at a predetermined level or higher (YES in step S27), the software rewriting device 60 notifies that the rewriting process is to be executed to the parking lot management device 400 and the user's terminal device 300 (step S28), executes the rewriting process (step S29), and ends the rewriting execution process shown in FIG. 7.

On the other hand, when it is determined that the communication environment in the parking space PS where the vehicle M is parked is below a predetermined level (NO in step S27), the software rewriting device 60 requests the parking lot management device 400 to guide to another parking space PS whose communication environment is at the predetermined level or higher (step S30). Then, as a result of the request, the software rewriting device 60 determines whether the vehicle M is parked in another parking space PS (step S31).

When it is determined that the vehicle M is not parked in the other parking space PS (NO in step S31), the software rewriting device 60 waits until the vehicle M is parked in the other parking space PS. Then, when it is determined that the vehicle M is parked in the other parking space PS (YES in step S31), the software rewriting device 60 shifts to step S26.

Post-Rewriting Process

Next, the post-rewriting process performed by the software rewriting device 60 will be described with reference to FIG. 8. The software rewriting device 60 performs the post-rewriting process shown in FIG. 8 when the rewriting process has been executed by the rewriting execution process shown in FIG. 7, for example.

Figure 8:
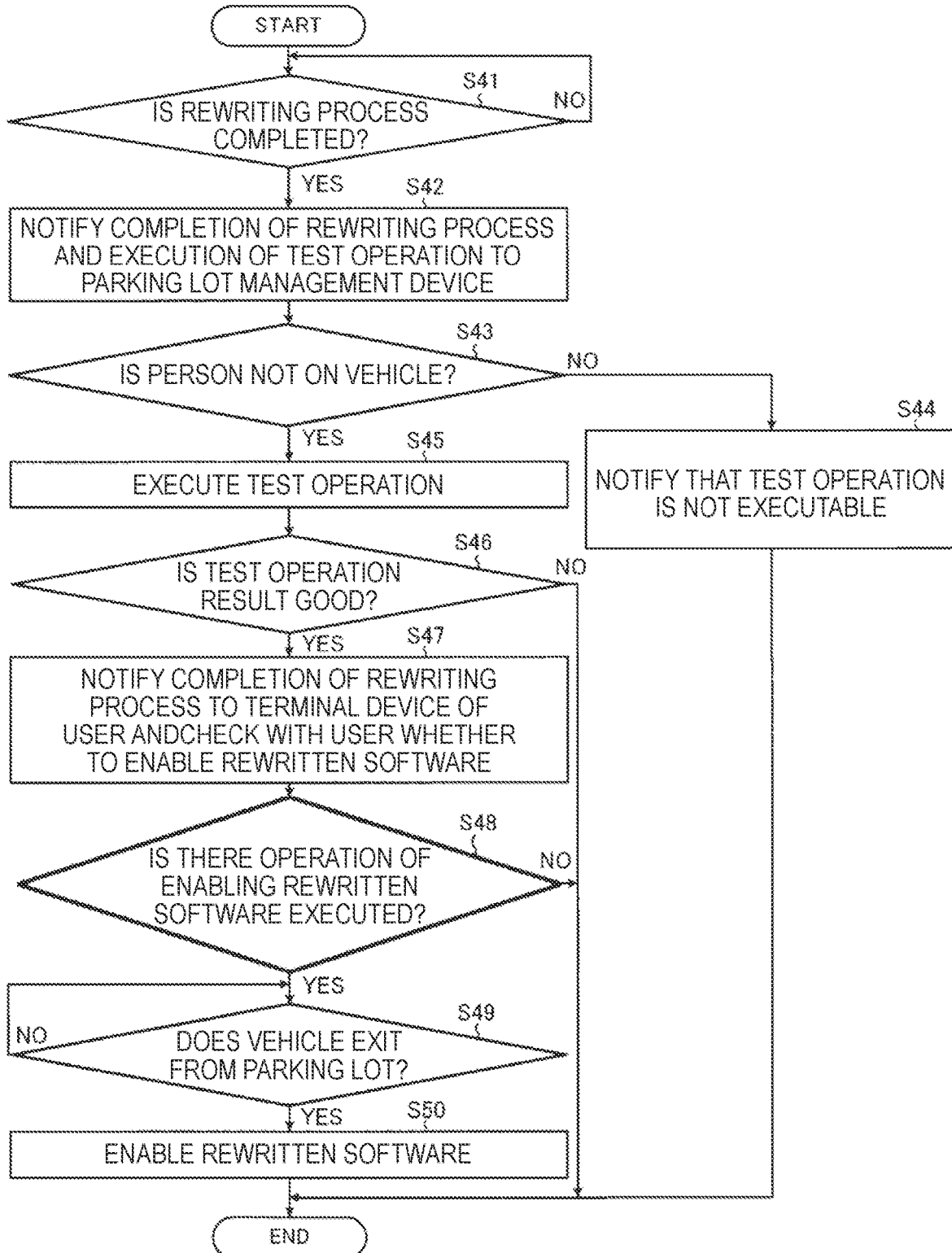
FIG. 8 is a flowchart showing an example of a rewriting execution process performed by the software rewriting device.

As shown in FIG. 8, in the post-rewriting process, the software rewriting device 60 determines whether the rewriting process has been completed (step S41). If the rewriting process has not been completed (NO in step S41), the software rewriting device 60 waits until the rewriting process is completed.

When the rewriting process is completed (YES in step S41), the software rewriting device 60 notifies the parking lot management device 400 that the rewriting process has been completed and that the test operation is to be executed (step S42). The software rewriting device 60 may separately notify the parking lot management device 400 that the rewriting process has been completed and that the test operation is to be executed. Next, the software rewriting device 60 determines whether a person is on the vehicle M to be subjected to the test operation (step S43).

When it is determined that a person is on the vehicle M (NO in step S43), the software rewriting device 60 notifies the person on the vehicle M that the test operation cannot be executed, via the input and output devices 20 and 42, and the like (step S44), and ends the post-rewriting process shown in FIG. 8. When it is determined that no person is on the vehicle M (YES in step S43), the software rewriting device 60 causes the vehicle M to execute the test operation (step S45). In step S45, as described above, the software rewriting device 60 causes, for example, perform a test operation in which the vehicle M is temporarily moved from the parked parking space PS and then parked again in the parking space PS.

Next, the software rewriting device 60 determines whether the test operation result by the test operation executed in step S45 is good (step S46). When it is determined that the test operation result is poor (NO in step S46), the software rewriting device 60 ends the post-rewriting process shown in FIG. 8 as it is. Here, since step S50, which will be described later, is not performed, the software rewritten by the rewriting process (software that is likely to be the cause of the poor test operation result) is not enabled.

On the other hand, when it is determined that the test operation result is good (YES in step S46), the software rewriting device 60 notifies the user's terminal device 300 that the rewriting process has been completed and ask the user whether to enable the software rewritten by the rewriting process (step S47). Then, the software rewriting device 60 determines whether there is an operation to enable the rewritten software based on the information received from the terminal device 300 as a result of the process in step S47 (step S48).

If there is no operation to enable the rewritten software, that is, if there is an operation not to enable the rewritten software (NO in step S48), the software rewriting device 60 ends the post-rewriting process as shown in FIG. 8 as it is. That is, even here, since step S50 described later is not performed, the software rewritten by the rewriting process is not enabled. Further, if there is an operation not to enable the rewritten software (that is, NO in step S48), the software rewriting device 60 may ask the user again whether to enable the rewritten software at a predetermined timing while the vehicle M is parked in the parking lot PA. Further, the software rewriting device 60 may ask the user again whether to enable the rewritten software when the next usage reservation of the parking lot PA is made, or when the vehicle M is parked in the parking lot PA next time based on the usage reservation or the like. Then, as a result of reconfirming with the user whether to enable the rewritten software, if an operation to enable the rewritten software is performed, the software rewriting device 60 enables the rewritten software. Here, since the test operation and the like have already been performed, the software rewriting device 60 only needs to enable the rewritten software.

On the other hand, if there is an operation to enable the rewritten software (YES in step S48), the software rewriting device 60 waits for the vehicle M to leave the parking lot PA (NO in step S49). If the vehicle M leaves the parking lot PA (YES in step S49), the software rewritten by the rewriting process is enabled (step S50), and the post-rewriting process shown in FIG. 8 ends.

Processing Performed by Parking Lot Management Device

Next, an example of the processing performed by the parking lot management device 400 will be described. The parking lot management device 400, for example, performs the parking position determination process shown in FIG. 9 at a predetermined cycle.

Figure 9:
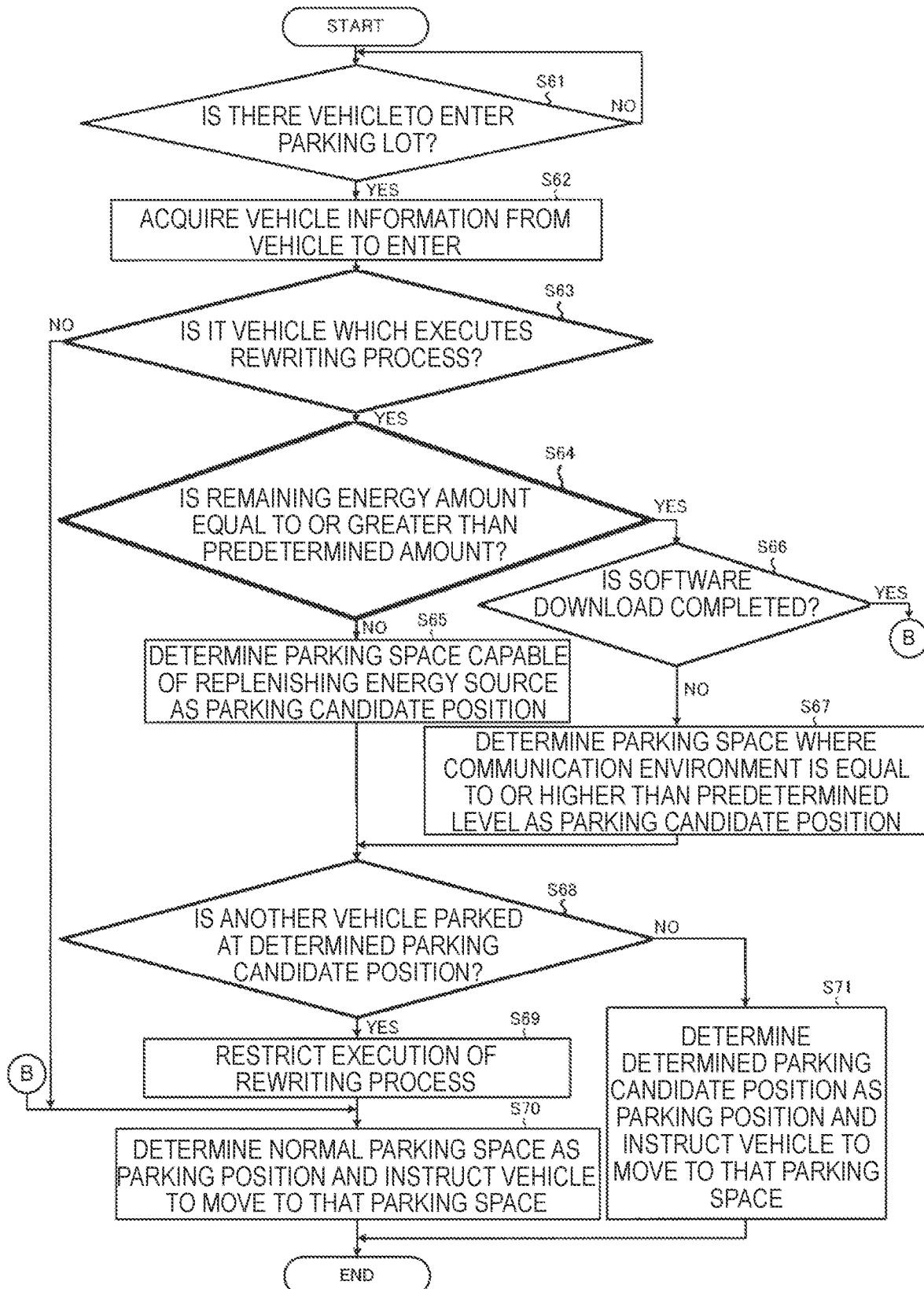
FIG. 9 is a flowchart showing an example of a post-rewriting process performed by the software rewriting device.

As shown in FIG. 9, in the parking position determination process, the parking lot management device 400 determines whether there is a vehicle entering the parking lot PA (step S61). When it is determined that there is no vehicle entering the parking lot PA (NO in step S61), the parking lot management device 400 repeats step S61.

When it is determined that there is a vehicle entering the parking lot PA (YES in step S61), the parking lot management device 400 acquires the vehicle information from the vehicle entering the parking lot PA (step S62). As a result, the parking lot management device 400 can acquire the information indicating whether the rewriting process is to be executed in the parking lot PA, whether the software used for the rewriting process has been downloaded, and the remaining energy, for the vehicle entering the parking lot PA.

Then, the parking lot management device 400 determines whether the entering vehicle is a vehicle that executes the rewriting process based on the vehicle information acquired in step S62 (step S63). When it is determined that the entering vehicle is a vehicle that does not execute the rewriting process (NO in step S63), the parking lot management device 400 shifts to step S70.

When it is determined that the entering vehicle is a vehicle that executes the rewriting process (YES in step S63), the parking lot management device 400 determines whether the remaining energy of the entering vehicle (that is, the vehicle that executes the rewriting process) is equal to or more than a predetermined amount based on the vehicle information acquired in step S62 (step S64).

When it is determined that the remaining energy of the entering vehicle is below the predetermined amount (NO in step S64), the parking lot management device 400 determines a parking space PS capable of supplying the energy source (that is, a parking space PS whose information indicating whether the energy source can be supplied is "possible") as a parking candidate position for the entering vehicle (step S65), and proceeds to step S68. In the present embodiment, it is assumed that the parking space PS capable of supplying an energy source has a communication environment at a predetermined level or higher.

When it is determined that the remaining energy of the entering vehicle is equal to or more than a predetermined amount (YES in step S64), the parking lot management device 400 determines whether the software used by the entering vehicle for the rewriting process has been downloaded based on the vehicle information acquired in step S62 (step S66). When it is determined that the software used for the rewriting process has not been downloaded (NO in step S66), the parking lot management device 400 determines a parking space PS whose communication environment is at a predetermined level or higher (that is, a parking space PS whose information indicating the communication environment is "strong") as a parking candidate position for the entering vehicle (step S67), and proceeds to step S68.

Next, the parking lot management device 400 determines whether another vehicle is parked at the parking candidate position determined by step S65 or step S67 (step S68). A parking space PS capable of supplying an energy source (a parking space PS whose information indicating whether the energy source can be supplied is "possible") and a parking space PS whose communication environment is at a predetermined level or higher (a parking space PS whose information indicating a communication environment is "strong") may be provided in plural. Here, the parking lot management device 400 determines whether other vehicles are parked in all of the parking spaces PS of the type determined as the parking candidate position.

When it is determined that another vehicle is parked at the determined parking candidate position (YES in step S68), since the parking lot management device 400 cannot allocate a parking space PS suitable for performing the rewriting process to the entering vehicle, the execution of the rewriting process of the vehicle is restricted by instructing the vehicle not to execute the rewriting process (step S69), and the process proceeds to step S70.

Next, the parking lot management device 400 determines a normal parking space PS as the parking position of the entering vehicle, instructs the vehicle to move to the parking space PS (step S70), and ends the parking position determination process shown FIG. 9. The normal parking space PS is, for example, a parking space PS where the information indicating whether the energy source of the parking space information can be supplied is "not possible" and the information indicating the communication environment is "weak".

On the other hand, when it is determined that no other vehicle is parked at the determined parking candidate position (NO in step S68), the parking lot management device 400 determines the determined parking candidate position (that is, a parking space PS suitable for performing the rewriting process) as the parking position of the entering vehicle, instructs the vehicle to move to the parking space PS (step S71), and ends the parking position determination process shown in FIG. 9.

Here, an example has been described in which the parking space PS capable of supplying an energy source has a communication environment at a predetermined level or higher, but the present invention is not limited thereto. If the communication environment of the parking space PS capable of supplying the energy source is not at the predetermined level or higher, first, the software may be downloaded in a place with a good communication environment, and then the vehicle may be moved (re-parked) to a parking space PS capable of supplying the energy source.

Processing Performed by Navigation Device
Parking Lot Search Process

Next, an example of the processing performed by the navigation device 40 will be described. First, the parking lot search process performed by the navigation device 40 will be described with reference to FIG. 10. The navigation device 40, for example, performs the parking lot search process shown in FIG. 10 at a predetermined cycle.

Figure 10:
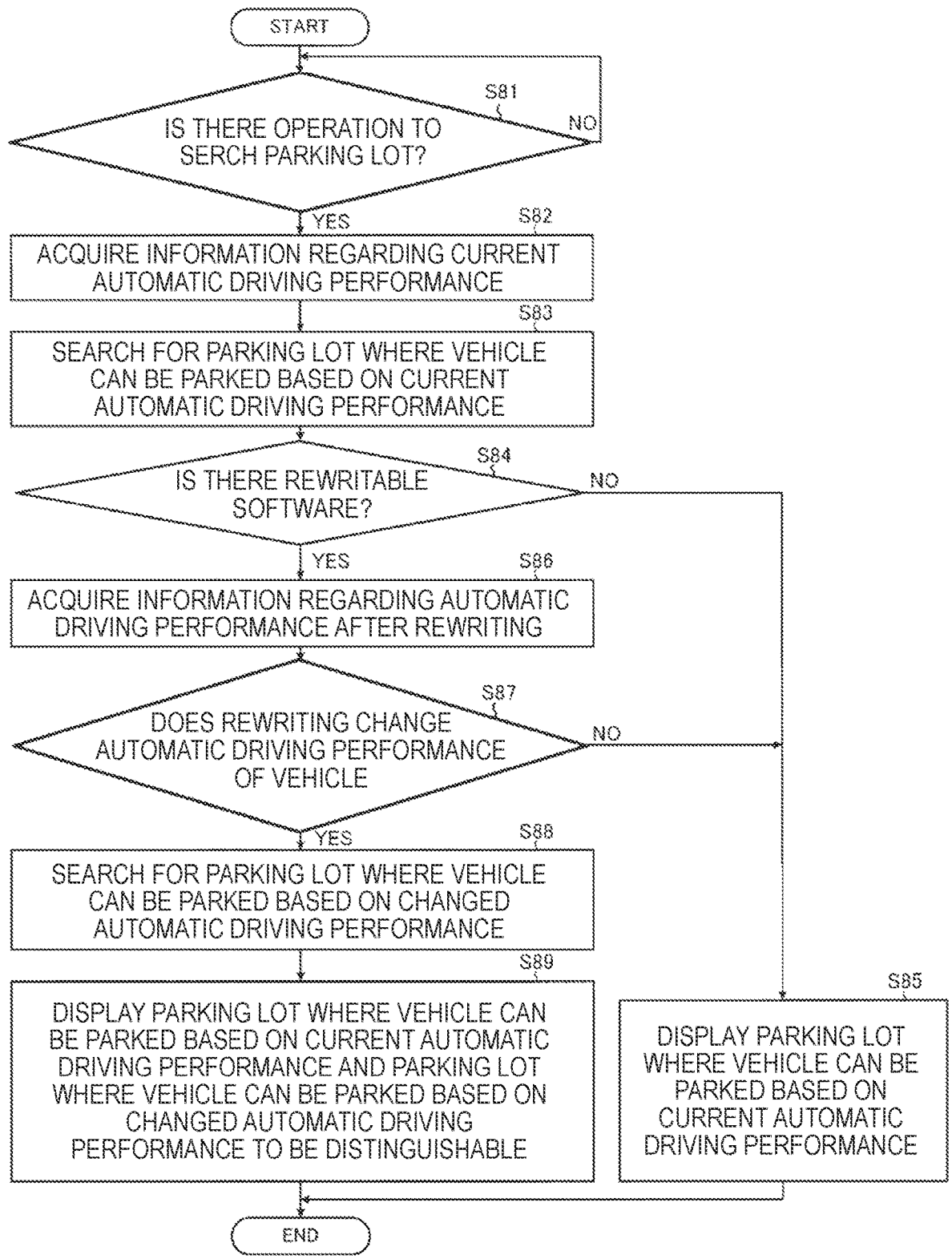
FIG. 10 is a flowchart showing an example of a parking position determination process performed by the parking lot management device.

As shown in FIG. 10, in the parking lot search process, the navigation device 40 determines whether the user has performed an operation to search for a parking lot (step S81). If there is no operation to search for a parking lot (NO in step S81), the navigation device 40 repeats step S81. If there is an operation to search for a parking lot (YES in step S81), the navigation device 40 acquires information indicating the current automatic driving performance of the vehicle M equipped with the own device from the automatic operation control device 100 with the information preset, or the like (step S82).

Then, the navigation device 40 searches for a parking lot where parking is possible with the current automatic driving performance of the vehicle M based on the information indicating the current automatic driving performance acquired in step S82 (step S83). In step S83, the navigation device 40 searches for a parking lot where parking is possible with the current automatic driving performance among the parking lots around the destination, for example, based on the information indicating the automatic driving performance required for parking in each parking lot included in the first map information 43, and information indicating the destination set by the user.

Next, the navigation device 40 makes an inquiry to, for example, the software distribution server 500 and determines whether there is rewritable software for the vehicle M (step S84). If it is determined that there is no rewritable software (NO in step S84), the navigation device 40 displays a parking lot searched in step S83, that is, a parking lot where parking is possible with the current automatic driving performance (step S85), and ends the parking lot search process shown in FIG. 10. In step S85, the navigation device 40 displays, for example, searched parking lots where parking is possible with the current automatic driving performance on the display of the input and output device 42 in a state where the user can identify the parking lots.

On the other hand, if it is determined that there is rewritable software (YES in step S84), the navigation device 40 acquires information indicating the automatic driving performance of the vehicle M after rewriting when the rewriting process is performed using the software from the software distribution server 500 (step S86).

Next, the navigation device 40 determines whether the automatic driving performance of the vehicle M is changed by rewriting the software based on the current automatic driving performance acquired in step S82 and the information indicating the automatic driving performance after rewriting acquired in step S85 (step S87).

If it is determined that the automatic driving performance of the vehicle M does not change by rewriting the software (NO in step S87), the navigation device 40 shifts to step S85. On the other hand, if it is determined that the automatic driving performance of the vehicle M changes by rewriting the software (YES in step S87), the navigation device 40 searches for a parking lot where parking is possible with the automatic driving performance of the vehicle M after the rewriting, that is, with the automatic driving performance after the change (step S88). In step S88, the navigation device 40 searches for, for example, a parking lot where parking is possible with the changed automatic driving performance, among the parking lots around the destination set by the user.

Then, the navigation device 40 separately displays a parking lot where parking is possible with the current automatic driving performance searched by step S83 and a parking lot where parking is possible with the changed automatic driving performance searched by step S88 (step S89), and ends the parking lot search process shown in FIG. 10. In step S89, the navigation device 40 displays, for example, a searched parking lot where parking is possible with the current automatic driving performance and a searched parking lot where parking is possible with the changed automatic driving performance on the display of the input and output device 42 in a state where the user can identify the parking lots. An example of the display screen displayed in step S89 will be described later with reference to FIG. 12 and the like.

Here, an example in which the processes of steps S81 to S83 are performed and then the processes of steps S84 and subsequent steps are performed has been described, but the present invention is not limited thereto. The processes of steps S81 to S83 and the processes of steps S84 and subsequent steps may be performed separately. That is, the processes of steps S84 and subsequent steps may be performed without performing the processes of steps S81 to S83.

Usage Reservation Process

Next, an example of the usage reservation process performed by the navigation device 40 will be described. For example, when the navigation device 40 displays the parking lot searched by the parking lot search process shown in FIG. 10, the navigation device 40 performs the usage reservation process shown in FIG. 11.

Figure 11:
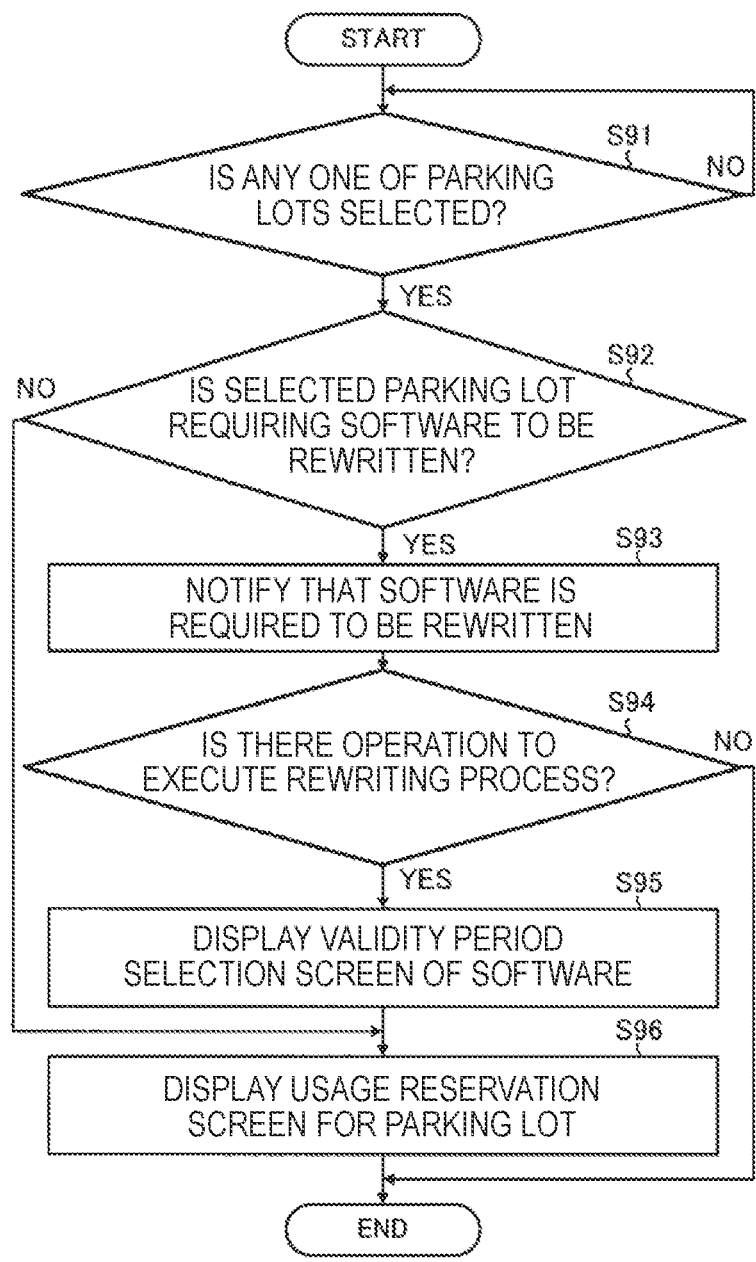
FIG. 11 is a flowchart showing an example of a parking lot search process performed by the navigation device.

As shown in FIG. 11, in the usage reservation process, the navigation device 40 determines whether the user has selected one of the parking lots displayed, for example, in step S85 or step S89 described above (step S91). If there is no operation for selecting a parking lot (NO in step S91), the navigation device 40 repeats step S91.

If there is an operation of selecting one of the parking lots (YES in step S91), the navigation device 40 determines whether the selected parking lot is a parking lot that requires software rewriting (step S92). For example, the navigation device 40 determines YES in step S92 when the automatic driving performance required for parking in the selected parking lot is higher than the current automatic driving performance of the vehicle M. On the other hand, the navigation device 40 determines NO in step S92 when the automatic driving performance required for parking in the selected parking lot is equal to or lower than the current automatic driving performance of the vehicle M.

If it is determined that the selected parking lot is a parking lot that does not require software rewriting (NO in step S92), the navigation device 40 shifts to step S96. On the other hand, if it is determined that the selected parking lot is a parking lot that requires software rewriting (YES in step S92), the navigation device 40 notifies the user that the software needs to be rewritten (step S93).

In step S93, the navigation device 40 displays, for example, a message such as "The software needs to be rewritten in order to park in the parking lot. Do you want to rewrite the software?" or operation buttons respectively corresponding to "Yes" and "No" on the display of the input and output device 42.

Then, the navigation device 40 determines whether there is an operation to rewrite the software, that is, an operation to execute the rewriting process (step S94). In step S94, the navigation device 40 determines, for example, whether the operation button corresponding to "Yes" displayed in step S93 has been operated.

If there is an operation not to rewrite the software (NO in step S94), that is, if an operation button corresponding to "No" displayed in step S93 is operated, the navigation device 40 ends the usage reservation process shown in FIG. 11. Here, for example, since step S96 described later is not performed, the user cannot make a reservation for using the selected parking lot (that is, the parking lot cannot be used).

On the other hand, if there is an operation to rewrite the software (YES in step S94), that is, if the operation button corresponding to "Yes" displayed in step S93 has been operated, the navigation device 40 displays the predetermined validity period selection screen on the display of the input and output device 42 or the like (step S95). Then, the navigation device 40 causes the user to input the validity period of the rewritten software via the validity period selection screen.

More specifically, on the validity period selection screen, the navigation device 40 displays a message such as "Please select a validity period of the software", and also operation buttons "1 day (price: 500 yen)" and "1 year (price: 5000 yen)" respectively on the display of the input and output device 42, and causes the user to input a desired validity period using the operation buttons.

Then, the navigation device 40 displays a usage reservation screen for inputting the vehicle ID, the scheduled entry date and time, the scheduled exit date and time, and the like on the display of the input and output device 42 (step S96), allows the user to make a usage reservation for the selected parking lot via the usage reservation screen, and ends the usage reservation process shown in FIG. 11.

Example of Display Screen of Navigation Device

Figure 12:
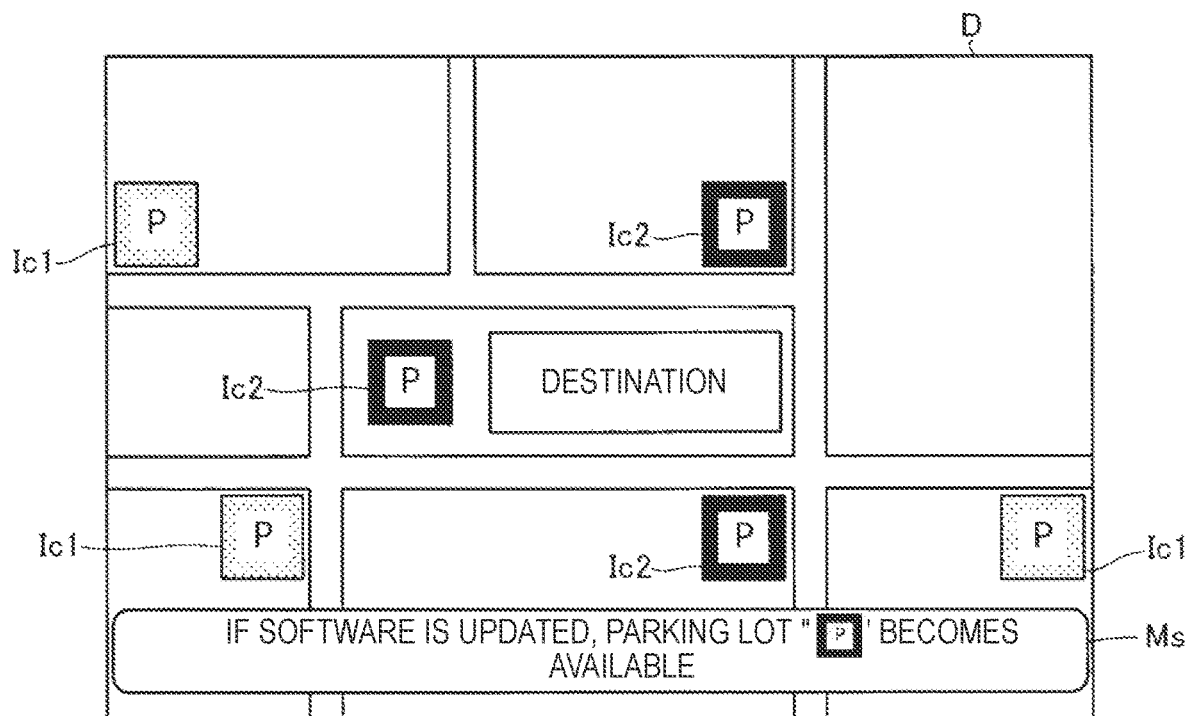
FIG. 12 is a flowchart showing an example of a usage reservation process performed by the navigation device.

Next, with reference to FIG. 12, an example of the display screen displayed by the navigation device 40 in step S89 described above will be described. As shown in FIG. 12, the navigation device 40 displays a first icon Ic1 (for example, a yellow icon) at a position corresponding to a parking lot (a parking lot searched in step S83) where parking is possible with the current automatic driving performance on the map displayed on the display D of the input and output device 42. On the other hand, the navigation device 40 displays a second icon Ic2 (for example, a red icon) of the type different from the first icon Ic1 in a position corresponding to a parking lot (the parking lot searched in step S87) where parking is possible with the changed automatic driving performance on the map.

Therefore, with reference to the first icon Ic1 and the second icon Ic2 displayed on the display D, the user can identify a parking lot where parking is possible with the current automatic driving performance and a searched parking lot where parking is possible with the changed automatic driving performance, and grasp the position of each parking lot. In the case of the example shown in FIG. 12, the user can understand that parking becomes possible in a parking lot close to (for example, adjacent to) the destination by rewriting the software of the vehicle M.

As shown in FIG. 12, the navigation device 40 may display a message Ms on the display D informing that the user can park in the parking lot of the second icon Ic2 by rewriting the software. As a result, the user can easily understand that parking becomes possible in the parking lot of the second icon Ic2 by rewriting the software.

The present invention is not limited to the above-described embodiment and an appropriate modification, improvement, and the like can be made.

For example, in the above-described embodiment, the first performance acquisition unit 44, the second performance acquisition unit 45, and the processing unit 46 are provided in the navigation device 40, and a notification device for notifying a parking lot where the vehicle M can be parked is realized by the navigation device 40. However, the present invention is not limited thereto. For example, the first performance acquisition unit 44, the second performance acquisition unit 45, and the processing unit 46 may be provided in the terminal device 300, and a notification device for notifying a parking lot where the vehicle M can be parked may be realized by the terminal device 300. Similarly, a notification device for notifying a parking lot where the vehicle M can be parked may be realized by the automatic driving control device 100. Here, the automatic driving control device 100 may notify a parking lot where the vehicle M can be parked by using, for example, the display of the input and output device 20.

Further, in the above-described embodiment, an example of executing the rewriting process in the parking lot PA has been described, but the present invention is not limited thereto. The place where the rewriting process is executed may be a place where the vehicle M is systematically parked (stopped) and the software rewriting device 60 can acquire the information indicating the scheduled parking time (scheduled stop time). The place where the rewriting process is executed is not limited to a public parking lot such as the parking lot PA and may be a parking lot at an individual's home.

Further, in the above-described embodiment, an example in which the moving body is a vehicle has been described, but the present invention is not limited thereto. The idea of the present invention can be applied not only to a vehicle but also to a robot, a ship, an aircraft, and the like, which includes a drive source and can be moved by the power of the drive source. Similarly, the accommodation area may be a hangar, a berth, a parking apron, or the like.

At least the following matters are described in the specification. The components and the like corresponding to the above-described embodiments are shown in parentheses, but the present invention is not limited thereto.

(1) A notification device (navigation device 40) configured to notify an accommodation area (parking lot PA) that can accommodate a moving body (vehicle M), in which
  the performance of the moving body that can be accommodated in the accommodation area is predetermined, and
  the notification device includes:
    a first determination unit (notification unit 47) configured to determine a first accommodation area that can accommodate the moving body with the current performance, based on the current performance of the moving body;
    a second determination unit (notification unit 47) configured to determine a second accommodation area that can accommodate the moving body with the performance after rewriting, based on the performance after the rewriting the software of the moving body; and
    a notification unit (notification unit 47) configured to separately notify the first accommodation area and the second accommodation area.

According to (1), since the first accommodation area where accommodation is possible with the current performance of the moving body and the second accommodation area where accommodation is possible with the performance after rewriting the software of the moving body are separately notified, it is possible to notify the user of the moving body how the accommodation area changes by rewriting the software of the moving body, and to prompt the rewriting of the software of the moving body.

(2) The notification device according to (1), where
the notification unit that separately notifies the first accommodation area and the second accommodation area when an operation of searching for an accommodation area that can accommodate the moving body is performed.

According to (2), when an operation of searching for an accommodation area that can accommodate a moving body is performed, since the first accommodation area and the second accommodation area are separately notified, the above notification can be performed at the timing when the user is interested in the accommodation area where the moving body can be accommodated. That is, the above notification can be effectively performed and the rewriting of the software of the moving body can be prompted.

(3) The notification device according to (1) or (2), where
the accommodation area is an area where the moving body can automatically move, and
the software is software related to the automatic movement of the moving body.

According to (3), it is possible to prompt rewriting of the software related to the automatic movement of a moving body.

(4) The notification device according to (3), where
when the software is rewritten while the moving body is accommodated in the first accommodation area, an operation of whether to move the moving body to the second accommodation area after rewriting the software is performed.

According to (4), when the software is rewritten while the moving body is accommodated in the first accommodation area, since the user is instructed to operate whether to move the moving body to the second accommodation area after rewriting the software, it is possible to improve the user convenience.

(5) The notification device according to any one of (1) to (4), where
the second accommodation area is an accommodation area in which tasks of the moving body is more than tasks of the first accommodation area.

According to (5), it is possible to notify the user of the second accommodation area having many tasks that can accommodate the moving body by rewriting the software of the moving body.

(6) The notification device according to any one of (1) to (5), wherein
when the software is rewritten, an operation of setting the validity period of the software to a first period or a second period longer than the first period is allowed.

According to (6), when the software is rewritten, since the operation of setting the validity period of the software to the first period or the second period is allowed, the user can set the desired validity period and the user convenience can be improved.

The invention claimed is:

1. A notification device, configured to notify an accommodation area that can accommodate a moving body, wherein:
a performance of the moving body that can be accommodated in the accommodation area is predetermined; and
the notification device includes:
a first determination unit configured to determine a first accommodation area that can accommodate the moving body with a current performance, based on current performance of the moving body;
a second determination unit configured to determine a second accommodation area that can accommodate the moving body with a performance after rewriting, based on performance of the moving body after rewriting the software of the moving body; and
a notification unit configured to separately notify the first accommodation area and the second accommodation area,
wherein the first determination unit, the second determination unit, and the notification unit are each implemented via at least one processor.

2. The notification device according to claim 1, wherein the notification unit separately notifies the first accommodation area and the second accommodation area when an operation of searching for an accommodation area that can accommodate the moving body is performed.

3. The notification device according to claim 1, wherein:
the accommodation area is an area where the moving body can automatically move; and
the software is software related to the automatic movement of the moving body.

4. The notification device according to claim 3, wherein when the software is rewritten while the moving body is accommodated in the first accommodation area, an operation of whether to move the moving body to the second accommodation area after rewriting the software is performed.

5. The notification device according to claim 1, wherein the second accommodation area is an accommodation area in which tasks of the moving body is more than tasks of the first accommodation area.

6. The notification device according to claim 1, wherein when the software is rewritten, an operation of setting a validity period of the software to a first period or a second period longer than the first period is allowed.

* * * * *